United States Patent [19]

Roberts et al.

[11] Patent Number: 4,912,333

[45] Date of Patent: Mar. 27, 1990

[54] X-RAY INTENSIFYING SCREEN PERMITTING AN IMPROVED RELATIONSHIP OF IMAGING SPEED TO SHARPNESS

[75] Inventors: Luther C. Roberts, Rochester, N.Y.; Mark A. Pollock, Johnson City, Tenn.; William E. Moore, Macedon, N.Y.; Jackee B. Raught; Larry K. Maier, both of Rochester, N.Y.

[73] Assignee: Eastman Kodak Company, Rochester, N.Y.

[21] Appl. No.: 243,374

[22] Filed: Sep. 12, 1988

[51] Int. Cl.⁴ .......... G01J 1/58

[52] U.S. Cl. .......... 250/487.1; 250/483.1

[58] Field of Search .......... 250/487.1, 483.1, 484.1 R

[56] References Cited

U.S. PATENT DOCUMENTS

| | | | |
|---|---|---|---|
| 3,154,461 | 10/1964 | Johnson | 161/116 |
| 3,787,238 | 1/1974 | Juliano | 117/335 R |
| 3,944,699 | 3/1976 | Mathews et al. | 428/210 |
| 4,187,113 | 2/1980 | Mathews et al. | 430/533 |
| 4,318,001 | 3/1982 | Degenhardt | 250/483 |
| 4,318,950 | 3/1982 | Takashi et al. | 428/143 |
| 4,340,639 | 7/1982 | Toyoda et al. | 428/338 |
| 4,377,616 | 3/1983 | Ashcraft et al. | 428/213 |
| 4,438,175 | 3/1984 | Ashcraft et al. | 428/315.5 |
| 4,501,971 | 2/1985 | Ochiai | 250/483.1 |
| 4,789,785 | 12/1988 | Yamazaki et al. | 250/487.1 |

FOREIGN PATENT DOCUMENTS

| | | |
|---|---|---|
| 1563591 | 3/1980 | United Kingdom . |
| 1563592 | 3/1980 | United Kingdom . |

OTHER PUBLICATIONS

H. H. Morris and P. I. Prescott, "White Opaque Plastic Film and Fiber for Papermaking Use," ACS Div. Org. Coatings Plastic Chemistry, vol. 34, pp. 75–80, 1974.

Pollock et al, U.S. Ser. No. 47,821, filed May 5, 1987, titled Shaped Articles from Polyesters and Cellulose Ester Compositions.

*Primary Examiner*—Janice A. Howell
*Assistant Examiner*—Richard Hanig
*Attorney, Agent, or Firm*—Carl O. Thomas

[57] ABSTRACT

An intensifying screen for imagewise exposing a radiographic element is disclosed comprised of a fluorescent layer capable of absorbing X-radiation and emitting longer wavelength electromagnetic radiation to which the radiographic element is responsive and a support capable of redirecting incident longer wavelength radiation back toward the radiographic element. The support includes in at least one portion reflective lenslets.

25 Claims, 8 Drawing Sheets

X-RAY INTENSIFYING SCREEN PERMITTING AN IMPROVED RELATIONSHIP OF IMAGING SPEED TO SHARPNESS

FIELD OF THE INVENTION

The invention relates to novel X-ray intensifying screens. More specifically, the invention relates to fluorescent screens of the type used to absorb an image pattern of X-radiation and emit a corresponding pattern of longer wavelength electromagnetic radiation to imagewise expose a radiographic element.

BACKGROUND OF THE INVENTION

In silver halide photography one or more radiation-sensitive emulsion layers are coated on a support and imagewise exposed to electromagnetic radiation to produce a latent image in the emulsion layer or layers. The latent image is converted to a viewable image upon subsequent processing.

Roentgen discovered X-radiation by the inadvertent exposure of a silver halide photographic element to X-rays. In 1913 the Eastman Kodak Company introduced its first silver halide photographic element specifically intended to be exposed by X-radiation—i.e., its first silver halide radiographic element.

The medical diagnostic value of radiographic imaging is accepted. Nevertheless, the desirability of limiting patient exposure to X-radiation has been appreciated from the inception of medical radiography. Silver halide radiographic elements are more responsive to longer wavelength electromagnetic radiation than to X-radiation. As herein employed the term "longer wavelength electromagnetic radiation" or "emitted radiation", except as otherwise qualified, indicates electromagnetic radiation in the 300 to 1500 nm spectral range, including both the near ultraviolet and blue regions of the spectrum to which silver halide possesses native sensitivity and the visible and near infrared portions of the spectrum to which silver halide is readily spectrally sensitized. Low X-ray absorption by silver halide radiographic elements as compared to absorption of longer wavelength electromagnetic radiation led quickly to the use of intensifying screens. The Patterson Screen Company in 1918 introduced matched intensifying screens for Kodak's first dual coated (Duplitized®) radiographic element. An intensifying screen contains on a support a fluorescent phosphor layer that absorbs the X-radiation more efficiently than silver halide and emits to the adjacent radiographic element longer wavelength electromagnetic radiation in an image pattern corresponding to that of the X-radiation received.

The need to increase the diagnostic capabilities of radiographic imaging while minimizing patient exposure to X-radiation has presented a diligently addressed challenge of long standing in the construction of both radiographic elements and intensifying screens. In constructing intensifying screens the ideal aim is to achieve the maximum longer wavelength electromagnetic radiation emission possible for a given level of X-radiation exposure (which is realized as maximum imaging speed) while obtaining the highest achievable level of image definition (i.e., sharpness or acuity). Since maximum speed and maximum sharpness in intensifying screen construction are not compatible, actual screens represent the best attainable compromise for their intended application.

The choice of a support for an intensifying screen illustrates the mutually exclusive choices that are confronted in screen optimization. It is generally recognized that supports having a high level of absorption of emitted longer wavelength electromagnetic radiation produce the sharpest radiographic images. Intensifying screens which produce the sharpest images are commonly constructed with black supports or supports loaded with carbon particles. Often transparent screen supports are employed with the intensifying screen being mounted in a cassette for exposure along with a black backing layer. In these screen constructions sharpness is improved at the expense of speed by failing to direct to the adjacent radiographic element a portion of the emitted longer wavelength electromagnetic radiation that might otherwise be available for latent image formation.

If a black or transparent intensifying screen support is replaced by a more reflective support, a substantial increase in speed can be realized. The most common conventional approach is to load or coat a screen support with a white pigment, such as titania or barium sulfate. Juliano U.S. Pat. No. 3,787,238, Degenhardt U.S. Pat. No. 4,318,001, and Ochiai U.S. Pat. No. 4,501,971, are offered as illustrative only, since the majority of well drafted patents describing intensifying screen constructions mention at least in passing similar options for support construction.

Even the best reflective supports identified by the art for intensifying screen construction have degraded image sharpness in relation to imaging speed so as to restrict their use to applications less demanding of image definition. Further, many types of reflective supports that have been found suitable for other purposes have been tried and rejected for use in intensifying screens. For example, the loading of intensifying screen supports with optical brighteners, widely employed as "whiteners", has been found to be incompatible with achieving satisfactory image definition.

By a process of trial and error over a development period of approximately 70 years the intensifying screen art has developed a bias for the selection of reflective supports from a relatively limited class of constructions and against regarding as suitable for intensifying screen construction support elements that, though nominally reflective, were developed for other, less demanding purposes.

During the last quarter century, a period in which the potentially deleterious effects of even low levels of X-radiation exposure have been publically called into question and a period in which every obvious expedient and a virtual continuum of inventions have been pressed into service to increase the capabilities of diagnostic radiographic imaging while reducing patient X-ray exposure, there has existed in the art a class of reflective supports that have never been suggested for use in intensifying screens, hereinafter referred to as "stretch cavitation microvoided" supports.

In 1964, Johnson U.S. Pat. No. 3,154,461, disclosed a polymeric film loaded with microbeads of calcium carbonate of from 1 to 5 $\mu$m in size. By biaxially stretching the support, stretch cavitation microvoids were introduced, rendering the support opaque.

Primary interest in stretch cavitation microvoided supports has centered on imparting to polymer film supports paper-like qualities, as illustrated by Takashi et al U.S. Pat. No. 4,318,950; Toyoda et al U.S. Pat. No. 4,340,639; Ashcraft et al U.S. Pat. Nos. 4,377,616 and 4,438,175; and H. H. Morris and P. I. Prescott, "White Opaque Plastic Film and Fiber for Papermaking Use," ACS Div. Org. Coatings Plastic Chemistry, Vol. 34, pp. 75–80, 1974.

More recently, stretch cavitation microvoided supports have been investigated as possible replacements for photographic print supports, as illustrated by Mathews et al U.S. Pat. Nos. 3,944,699 and 4,187,113 and Remmington et al U.K. Patent Specifications 1,593,591 and 1,593,592. Polypropylene microbeads are in one instance employed, but the preferred microbeads are white pigment barium sulfate microbeads.

Pollock et al U.S. Ser. No. 47,821, filed May 5, 1987, titled SHAPED ARTICLES FROM POLYESTERS AND CELLULOSE ESTER COMPOSITIONS, commonly assigned, discloses stretch cavitation microvoided shaped articles, such as films, sheets, bottles, tubes, fibers, and rods, wherein the polymer forming the continuous phase is a polyester and the microbeads are a cellulose ester.

From the 1960 filing of Johnson U.S. Pat. No. 3,154,461 until this invention there has been no suggestion that stretch cavitation microvoided supports would be suitable for the demanding requirements of radiographic intensifying screens.

SUMMARY OF THE INVENTION

It is a recognition of this invention that superior intensifying screens for use with silver halide radiographic elements can be constructed exhibiting a balance of imaging speed and sharpness not heretofore achieved in the art.

In one aspect, this invention is directed to an intensifying screen for producing a latent image in a silver halide radiographic element when imagewise exposed to X-radiation comprised of (i) a fluorescent layer capable of absorbing X-radiation and emitting for latent image formation longer wavelength electromagnetic radiation more readily absorbed by the silver halide radiographic element when X-radiation and (ii) a support capable of reflecting the longer wavelength radiation, characterized in that at least one portion of the support is comprised of reflective lenslets.

In a specific preferred implementation, the reflective portion of the support is comprised of three distinct phases: (a) a polymeric continuous phase transparent to the longer wavelength electromagnetic radiation, (b) immiscible microbeads forming a dispersed second phase in the polymeric phase, and (c) stretch cavitation microvoids forming reflective lenslets concentrically positioned with respect the microbeads and having major axes oriented parallel to the fluorescent layer. In a specific preferred embodiment of this implementation the microbeads are themselves transparent to the longer wavelength electromagnetic radiation.

In another preferred implementation, the reflective portion of the support is comprised of spherical or spheroidal beads transparent to the lower wavelength electromagnetic radiation dispersed in a polymeric continuous phase, wherein the refractive index of the beads exceeds the refractive index of the continuous phase. In a specific embodiment of this implementation, the beads are spheres and have a higher refractive index than that of the surrounding continuous polymeric medium, with of ratio of the higher refractive index of the sphere and the lesser refractive index of the surrounding continuous polymeric phase being in the range of from 1.7 to 2.1.

In an additional preferred implementation, the lenslets are gas filled cells having minor axes normal to the fluorescent layer, with the ratio of the major to minor axes being in the range of 1.5:1 to 10:1.

The invention is based on the discovery that a novel and improved relationship of speed and sharpness can be realized when an intensifying screen is constructed employing a support having at least one reflective portion containing reflective lenslets which are either spherical or oriented with their major axes parallel to the fluorescent layer of the intensifying screen.

The invention is based on the further recognition that (a) stretch cavitation microvoided supports, (b) supports containing transparent spherical or oriented spheroidal beads of properly chosen refractive indices, or (c) properly oriented and proportioned gas filled cells are capable of providing the reflective lenslets required.

The invention is further based on the identification of specific stretch cavitation microvoided supports having superior properties as reflective intensifying screen supports.

The invention is still further based on the discovery that intensifying screens of increased speed and sharpness can be constructed by employing supports containing lenslets in the form of retroreflective spheres.

Finally, the invention is directed to certain radiographic intensifying screens produced by advantageous combinations of fluorescent layers and reflective lenslet supports.

The invention, including advantages of specific selections and combinations, can be more fully appreciated by reference to the description of preferred embodiments and the drawings.

DESCRIPTION OF PREFERRED EMBODIMENTS

Figure 1:
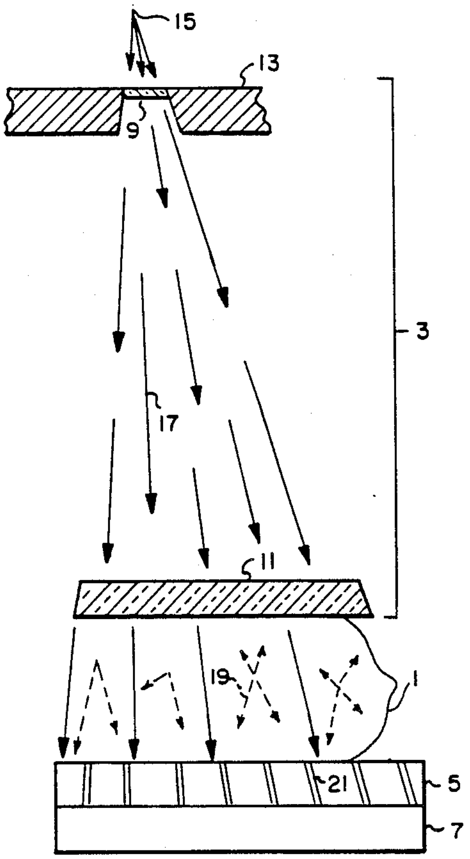
FIG. 1 is a schematic diagram of an imaging arrangement.

A typical arrangement for examining human tissue with X-radiation is illustrated in FIG. 1. Tissue 1 to be examined radiographically, in this instance a mamma (breast), is located between an exposure and compression arrangement 3 and an exposure grid 5. Beneath the grid is located an exposure recording assembly 7.

The exposure and compression arrangement is comprised of a radiation input window 9 (the output window of an X-radiation generating tube) and an output window 11 (the input window for supplying X-radiation to the subject), which are each substantially transparent to X-radiation. The output window acts as a compression element so that the mamma is held well compressed during examination. A wall 13 formed of a material having low penetrability to X-radiation joins the input window and defines with it an X-radiation field emanating from a tube or other conventional source, shown schematically as emanating from focal spot 15.

Unscattered X-radiation passing through the input and output windows and tissue to the grid is indicated by the solid arrows 17. Collisions of X-radiation with matter within the tissue results in part in absorption of the X-radiation and in part in redirecting the X-radiation. Redirected—i.e., scattered X-radiation—is illustrated schematically by dashed arrows 19.

The grid is equipped with vanes 21, which are relatively impenetrable by the X-radiation and arranged parallel to the unscattered X-radiation. The vanes permit almost all of the unscattered X-radiation to pass through the grid uninterruted. X-radiation that has been slightly redirected is capable of passing through the grid also, but the most highly scattered X-radiation, which if left alone, would produce the greatest degradation in image sharpness, is intercepted and deflected by the vanes. The thickness and spacing of the vanes is exaggerated in FIG. 1 for ease of illustration. By vane construction and spacing the desired balance between the attenuation of X-radiation supplied to the exposure recording assembly and the sharpness of the image can be realized. To minimize X-ray attenuation the grid can be entirely eliminated, but a grid is usually preferred to improve sharpness. Suitable exposure grids are known and commercially available.

Figure 2:
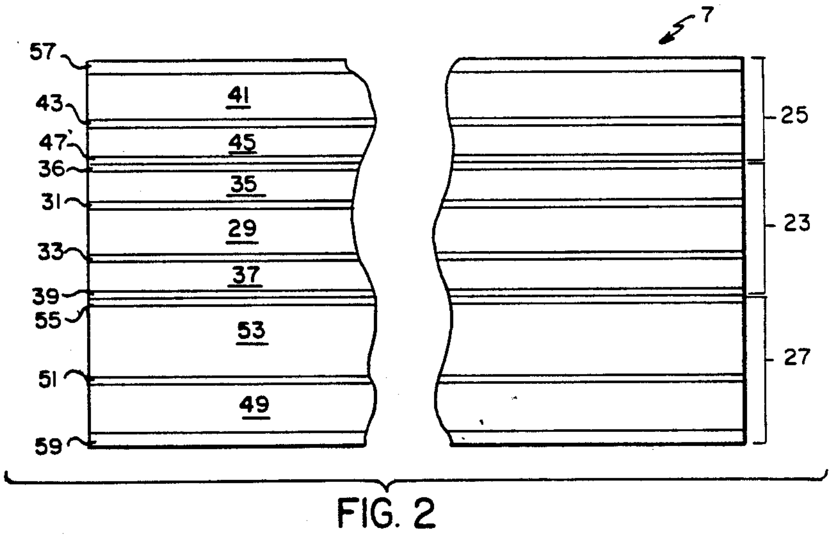
FIG. 2 is a schematic diagram of a dual coated radiographic element and intensifying screen pair assembly.

In FIG. 2 the exposure recording assembly is shown in greater detail. A conventional case or cassette used to compress the elements of the assembly into close contact is not shown. The assembly consists of three separate elements, a dual coated silver halide radiographic element 23, a front intensifying screen 25 intended to be positioned between the radiographic element and an exposing X-radiation source, and a back intensifying screen 27.

As shown, the dual coated radiographic element consists of a support 29 including subbing layers 31 and 33 coated on its opposite major faces. Silver halide emulsion layers 35 and 37 overlie the subbing layers 31 and 33, respectively. Overcoat layers 36 and 39 overlie the emulsion layers 35 and 37, respectively.

As shown, the front intensifying screen is comprised of a support consisting of a substrate portion 41 and an interposed layer portion 43, a fluorescent layer 45, and an overcoat layer 47. Similarly, the back intensifying screen as shown is comprised of a support consisting of a substrate portion 49 and an interposed layer portion 51, a fluorescent layer 53, and an overcoat layer 55. Anticurl layers 57 and 59 are on the major faces of the front and back screen substrate portions 41 and 49, respectively, opposite the fluorescent layers.

In use, X-radiation enters the image recording assembly through the front screen anticurl layer 57 and substrate portion 41 passing uninterrupted to fluorescent layer 45. A portion of the X-radiation is absorbed in the front screen fluorescent layer. The remaining X-radiation passes through the overcoat layers 47 and 36. A small portion of the X-radiation is adsorbed in the silver halide emulsion layer 35, thereby contributing directly to the formation of a latent image in the emulsion layer. However, the major portion of the X-radiation received by the emulsion layer 35 passes through the support 29 and associated subbing layers 31 and 33 to the remaining silver halide emulsion layer 37. Again, a small portion of the X-radiation is absorbed in the remaining silver halide emulsion, thereby contributing directly to the formation of a latent image in this emulsion layer, and, again, the major portion of the X-radiation received by the emulsion layer 37 passes through the overcoat layers 39 and 55 to the fluorescent layer 53 of the back screen. The major portion of the X-radiation striking the back screen fluorescent layer is absorbed in this layer.

Exposing X-radiation is principally absorbed in the fluorescent layers 45 and 53 and reemitted by the fluorescent layers as longer wavelength electromagnetic radiation more readily absorbed by the silver halide radiographic element 23. Longer wavelength electromagnetic radiation emitted by the front intensifying screen fluorescent layer 45 exposes the adjacent silver halide emulsion layer 35. Longer wavelength electromagnetic radiation emitted by the back intensifying screen fluorescent layer 53 exposes the adjacent silver halide emulsion layer 37. These longer wavelength electromagnetic radiation exposures primarily account for the latent image formed in the silver halide emulsion layers.

From the foregoing, it is apparent that all of the layers above the fluorescent layer 53 must be penetrable by X-radiation to at least some extent. While the silver halide emulsion layers usefully absorb some X-radiation, the only other usefully absorbed X-radiation occurs in the front intensifying screen fluorescent layer. Thus, the supports and overcoat and subbing layers overlying the back intensifying screen are chosen to be as nearly transparent to exposing X-radiation as possible.

It is also apparent that the overcoat layers 36 and 47 separating the front intensifying screen fluorescent layer and the emulsion layer adjacent thereto as well as the overcoat layers 39 and 55 separating the back intensifying screen fluorescent layer and the emulsion layer adjacent thereto are preferably transparent to the emitted longer wavelength electromagnetic radiation. Being transparent to both X-radiation and longer wavelength electromagnetic radiation, the overcoat layers 36, 47, 39, and 55, though preferred for other reasons, are not needed for imaging and can be omitted.

To realize the advantages of the present invention only one of the two intensifying screens in the exposure recording assembly 7 need contain a reflective lenslet support. If only one of the two intensifying screens employs a reflective support, it is preferred that the back screen be a reflective lenslet support. Because of the superior imaging properties attainable with intensifying screens containing reflective supports satisfying the requirements of the invention, it is specifically recognized that both the front and back intensifying screens of the exposure recording assembly can contain reflective lenslet supports satisfying the requirements of the invention.

It is, of course, recognized that in the simplest possible combination one intensifying screen satisfying the requirements of the invention and a radiographic element containing only one silver halide emulsion layer are capable of producing a radiographic image. In other words, the exposure recording assembly 7 can be simplified by removing all of the layers and elements above or below the support 29. With the elimination of one intensifying screen, imaging speed is, of course, lowered. However, crossover, which is a well recognized source of unsharpness in radiographic elements containing dual coated emulsion layers is also eliminated, and the improved properties of the reflective lenslet support satisfying the requirements of the invention is capable of boosting imaging speed with the least possible reduction in sharpness.

Nevertheless, in their preferred use, to realize the sharpest possible images at the highest attainable imaging speeds, the intensifying screens of this invention are employed as one or both members of a front and back intensifying screen pair intended to be employed in combination with a dual coated silver halide radiographic element, as described above. Specifically preferred radiographic elements are those which exhibit the highest attainable speeds in relationship to sharpness—e.g., tabular grain radiographic elements which exhibit a crossover of less than 10 percent and, optimally, less than 1 percent crossover, more specifically identified below. Additionally, for the reasons set forth below, fluorescent layers that satisfy the higher performance requirements of the art produce in combination with the reflective lenslet supports required by this invention intensifying screens that exceed the performance capabilities of conventional intensifying screens.

In FIG. 2 the intensifying screens 25 and 27 are shown as including substrate portions 41 and 49 and interposed layer portions 43 and 51, respectively. Further, anticurl layers 57 and 59 are shown associated with the substrate portions. Anticurl layers are, of course, a practical convenience rather than a requirement for screen construction and can be eliminated when the substrate portions are sufficiently rigid to resist curl.

In one form of the invention, when the intensifying screen support includes both substrate and interposed layer portions, the substrate portion is the reflective lenslet portion of the support and the interposed layer portion is a conventional transparent subbing layer or combination of subbing layers. In the preferred reflective lenslet substrate constructions the presence of the lenslets not only increases the reflectivity of the substrate, but also improves its texture for adhesion of the fluorescent layer. Thus in a specifically preferred form of the invention no subbing layer is required, and the interposed layer can be eliminated, resulting in a unitary reflective lenslet support.

In an alternate form, the substrate portion can be a conventional transparent support, preferably a transparent polymeric film support, and the interposed layer portion can constitute the reflective lenslet portion of the support. A further possible variant is to supplement the reflectivity of the interposed reflective lenslet layer portion with a reflective substrate portion, which can also be a reflective lenslet portion or can take another reflective form known to be useful in the construction of intensifying screens.

For simplicity the discussion which follows is directed to the unitary relective lenslet support construction noted above. The applicability of the description to the alternate support constructions set forth above is readily apparent.

Stretch Cavitation Microvoided Supports

Figure 3:
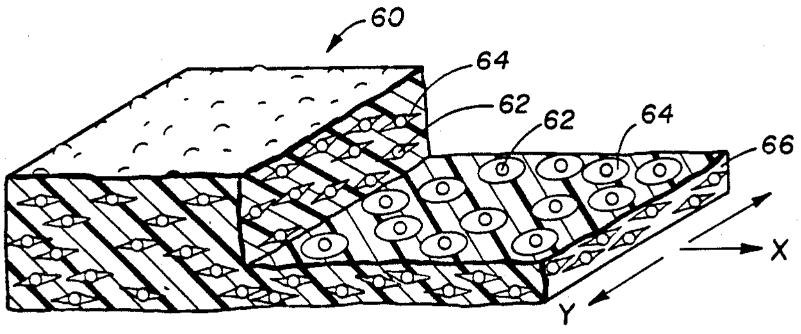
FIG. 3 is a perspective view in section illustrating a preferred embodiment of a reflective lenslet support.

FIG. 3 illustrates a unitary reflective lenslet support 60 which has been biaxially oriented [biaxially stretched, i.e., stretched in both the longitudinal (X) and transverse (Y) directions], as indicated by the arrows. The support 60 is illustrated in section, showing microbeads 62 contained within circular microvoids 64 in the polymeric continuous matrix 66. The microvoids 64 surrounding the microbeads 62 are theoretically regular in shape, but on microscopic examination often show irregularities, particularly when the random spacing of the microbeads results in two or more microbeads being located in close proximity.

Figure 4:
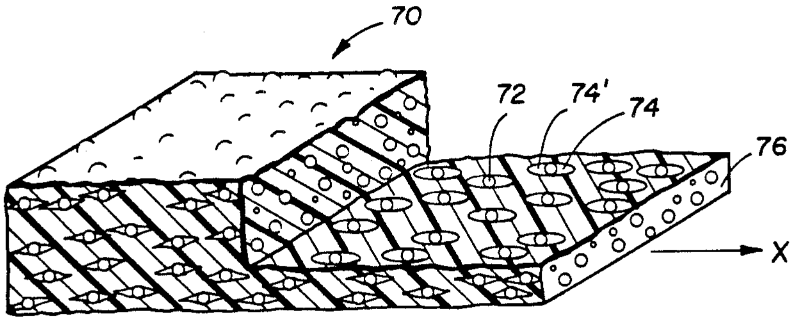
FIG. 4 is a perspective view in section illustrating an alternate construction of a reflective lenslet support.

FIG. 4 also illustrates a unitary reflective lenslet support 70 which has been unidirectionally oriented (stretched in one direction only, as indicated by the arrow). Microbeads 72 are contained between microvoid lobes 74 and 74'. The microvoid lobes in this instance form at opposite sides of the microbeads as the sheet is stretched. Thus, if the stretching is done in only the longitudinal direction (X) as indicated by the arrow, the microvoids will form on the leading and trailing sides of the microbeads. This is because of the unidirectional orientation as opposed to the bidirectional orientation of the sheet shown in FIG. 4. This is the only difference between the supports of FIGS. 3 and 4.

Attention is particularly directed to the texture of the upper surfaces of the reflective lenslet supports in each of FIGS. 3 and 4.

Figure 6:
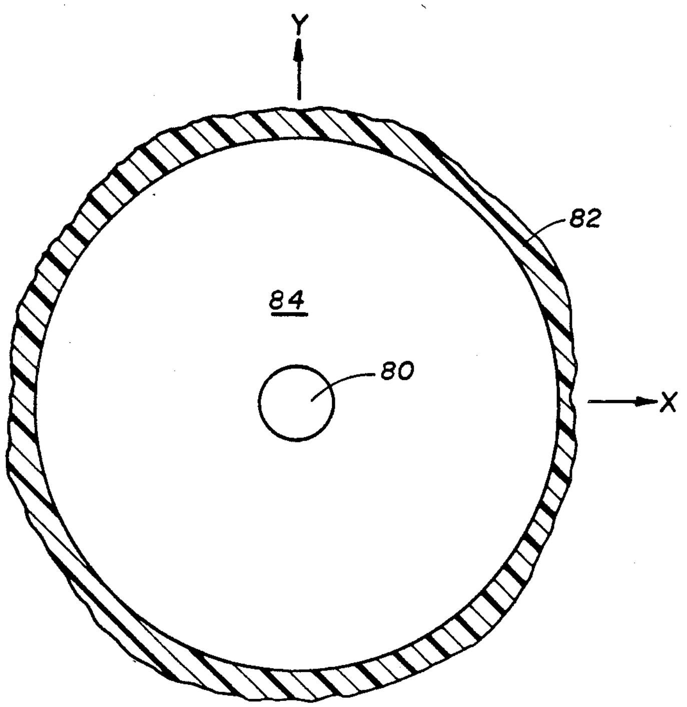
FIG. 6 is a sectional view taken along section line 6—6 in FIG. 5.
Figure 5:
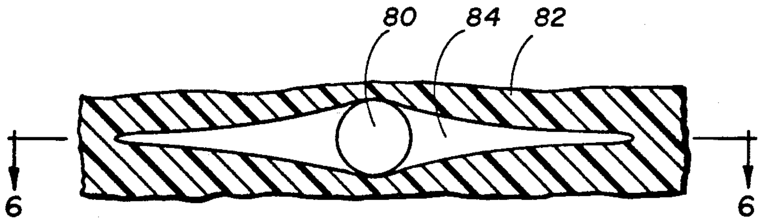
FIG. 5 is a sectional view of a single lenslet of the support of FIG. 3.

FIGS. 5 and 6 are sectional views which illustrate on an enlarged scale a single reflective lenslet, microbead 80 being entrapped within the polymeric continuous matrix 82 and encircled by microvoid 84. This lenslet shape results from the support being stretched in both the X and Y directions.

Figure 7:
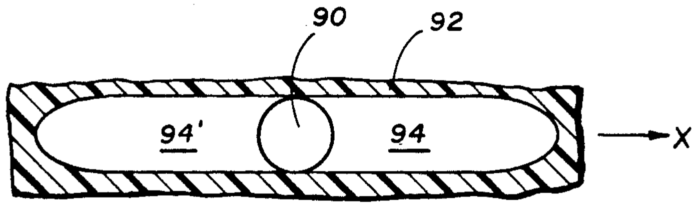
FIG. 7 is a sectional view of a single lenslet of the support of FIG. 4.

FIG. 7 is a view similar to FIG. 5, except illustrating in enlarged form microbead 90 entrapped in the polymeric continuous matrix 92, having formed on opposite sides thereof microvoid lobes 94 and 94', which are formed when the support is stretched only in the direction of the arrow X.

The foregoing description is generally applicable to stretch cavitation microvoided articles capable of being employed as reflective lenslet supports in the intensifying screens of this invention. The description that follows provides a further illustration of this form of the invention by referring to specific, preferred embodiments—specifically, to the choice of superior reflective lenslet supports from among the polyester continuous phase or matrix and cellulose acetate microbead shaped articles disclosed by Pollock et al U.S. Ser. No. 047,821, filed May 5, 1987, cited above.

Figure 8:
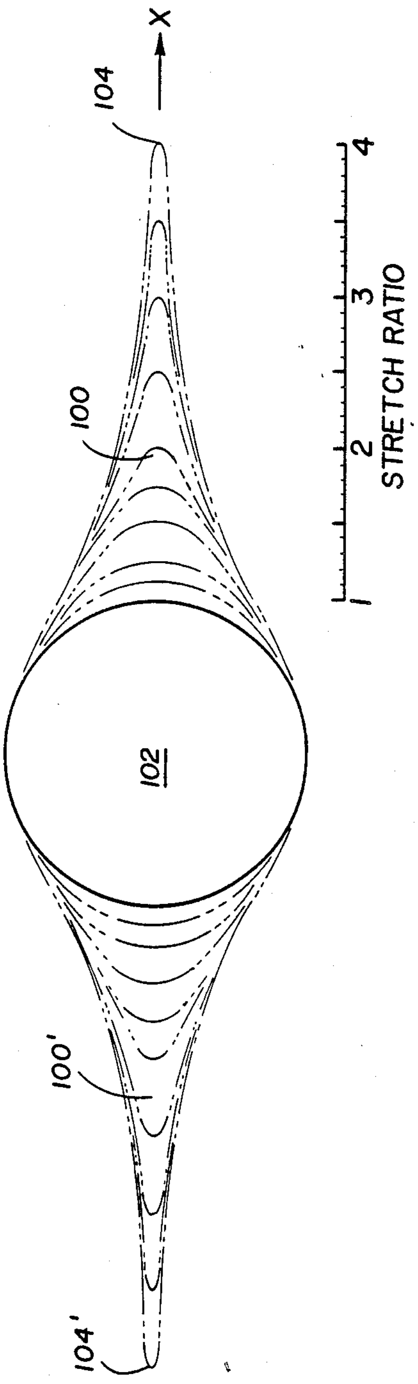
FIG. 8 is a graphical view illustrating the change in size of microvoids surrounding microbeads as a function of the stretch ratio.

FIG. 8 is an enlargement illustrating a specific manner in which microvoids can be formed in a polyester continuous matrix as the support is stretched or oriented. The formation of the microvoids 100 and 100' around microbeads 102 is illustrated on a stretch ratio scale as the support is stretched up to 4 times its original dimension. For example, as the support is stretched 4 times its original dimension in the X direction (4X), the microvoids extend to the points 104 and 104', respectively.

Figure 9:
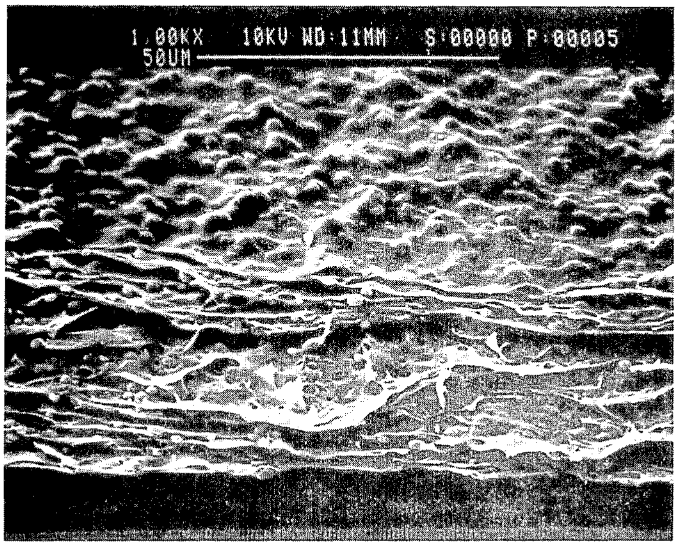
FIGS. 9, 10, and 11 are photomicrographs of reflective lenslet supports formed of a polyester continuous phase, cellulose ester microbeads forming a second phase, and reflective microvoid lenslets bordering the microbeads.
Figure 10:
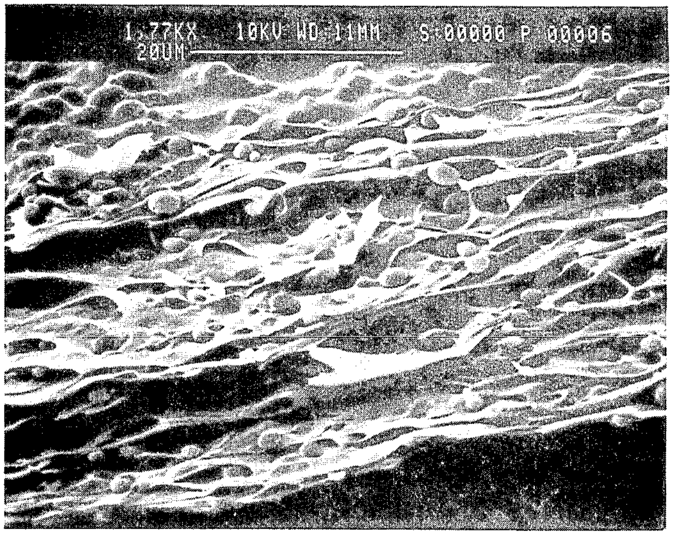
Figure 11:
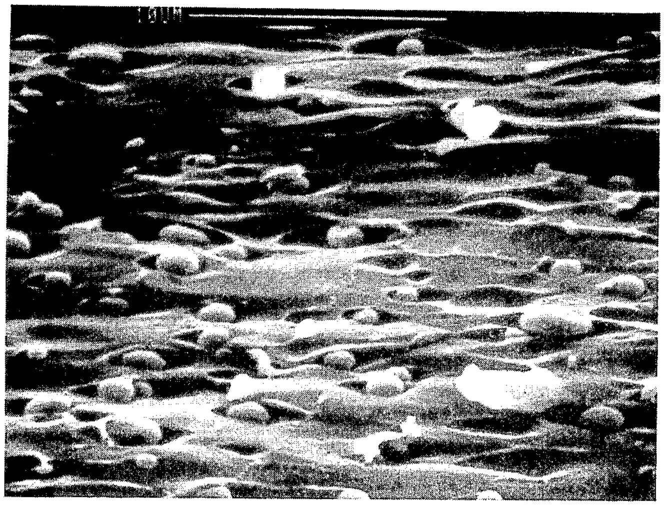

FIGS. 9 and 10 are actual photomicrographs of sections of a reflective lenslet support according to this invention which has been frozen and fractured. The continuous polymeric matrix, microbeads, and microvoids are obvious. FIG. 11 is an actual photomicrograph of a section of support oriented in one direction. The scale of these photomicrographs is indicated at the top of each in micrometers (μm).

In this preferred form of the invention the reflective lenslet supports are comprised of a continuous thermoplastic polyester phase having dispersed therein microbeads of cellulose ester which are at least partially bordered by voids. The supports are conveniently in the form of sheets or film. The polyester is relatively strong and tough, while the cellulose acetate is relatively hard and brittle.

More specifically, the present invention provides supports comprising a continuous thermoplastic polyester phase having dispersed therein microbeads of cellulose ester which are at least partially bordered by voids, the microbeads of cellulose acetate being present in an amount of 10–30% by weight based on the weight of polyester, the voids occupying 2–50% by volume of the shaped article, the composition of the shaped article when consisting only of the polyester continuous phase and microbeads of cellulose ester bordered by voids characterized by having a Kubelka-Munk R value (infinite thickness) of 0.90 to 1.0 and the following Kubelka-Munk values when formed into a 3 mil (76.2 microns) thick film:

Opacity: about 0.78 to about 1.0
SX: 25 or less
KX: about 0.001 to 0.2
Ti: about 0.02 to 1.0 wherein the opacity values indicate that the article is opaque, the SX values indicate a large amount of light scattering through the thickness of the article, the KX values indicate a low amount of light absorption through the thickness of the article, and the Ti values indicate a low level amount of internal transmittance of the thickness of the article. The R (infinite thickness) values indicate a large amount of light reflectance.

Obviously, the Kubelka-Munk values which are dependent on thickness of the article must be specified at a certain thickness. Although the supports themselves may be very thin, e.g., less than 1 mil (25.4 micron) or they may be thicker, e.g., 20 mils (508 microns), the Kubelka-Munk values, except for R(∞), are specified at 3 mils (76.2 microns) and in the absence of any additives which would effect optical properties. Thus, to determine whether supports have the optical properties called for, the polyester containing microbeads at least partially bordered by voids, without additives, should be formed in a 3 mils (approx. 75 μm) thick film for determination of Kubelka-Munk values.

The supports according to this invention are useful, for example, when in the forms of sheets or films. In the absence of additives or colorants, they are very white. The supports are very resistant to wear, moisture, oil, tearing, etc.

The polyester (or copolyester) phase may be any article-forming polyester such as a polyester capable of being cast into a film or sheet, spun into fibers, extruded into rods or extrusion, blow-molded into containers such as bottles, etc. The polyesters should have a glass transition temperature between 50° C. and 150° C., preferably 60°–100° C., should be orientable, and have an I.V. of at least 0.55, preferably 0.6 to 0.9. Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, and mixtures thereof. Examples of suitable glycols include ethylene glycol, propylene glycol, butanediol, pentanediol, hexanediol, 1,4-cyclohexanedimethanol, diethylene glycol, and mixtures thereof. Such polyesters are well known in the art and may be produced by well-known techniques, e.g., those described in U.S. Pat. Nos. 2,465,319 and 2,901,466. The preferred polyester is polyethylene terephthalate having a Tg of about 80° C. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607, 4,459,402 and 4,468,510.

Blends of polyesters and/or copolyesters are useful in the present invention. Also, small amounts of other polymers such as polyolefins can be tolerated in the continuous matrix.

Suitable cellulose acetates are those having an acetyl content of 28 to 44.8% by weight, and a viscosity of 0.01–90 seconds. Such cellulose acetates are well known in the art. Small contents of propionyl can usually be tolerated. Also, processes for preparing such cellulose acetates are well known in the art. Suitable commercially available cellulose acetates include the following which are marketed by Eastman Chemical Products, Inc.:

| Cellulose Acetate Type | Viscosity[1] Seconds | Viscosity[1] Poises (Pascal-Sec.) | Acetyl Content %[2] | Hydroxyl Content %[2] | Melting Range °C. | Tg, °C. | Number Average Molecular Weight[3] |
|---|---|---|---|---|---|---|---|
| CA-394-60S | 60.0 | 22.8 | 39.5 | 4.0 | 240–260 | 186 | 60,000 |
| CA-398-3 | 3.0 | 1.14 | 39.8 | 3.5 | 230–250 | 180 | 30,000 |
| CA-398-6 | 6.0 | 2.28 | 39.8 | 3.5 | 230–250 | 182 | 35,000 |
| CA-398-10 | 10.0 | 3.80 | 39.8 | 3.5 | 230–250 | 185 | 40,000 |
| CA-398-30 | 30.0 | 11.40 | 39.7 | 3.5 | 230–250 | 189 | 50,000 |
| CA-320S | 0.05 | 0.02 | 32.0 | 8.4 | 190–269 | about 180–190 | about 18,000 |
| CA-436-80S | 80 | 30.4 | 43.7 | 0.82 | 269–300 | 180 | 102,000 |

[1]ASTM D817 (Formula A) and D1343
[2]ASTM D817
[3]Molecular weights are polystyrene equivalent molecular weights, using Gel Permeation Chromatography The microbeads of cellulose esters range in size from 0.1–50 microns, and are present in an amount of 10–30% by weight based on the weight of the polyester. The microbeads of cellulose acetate have a Tg of at least 20° C. higher than the Tg of the polyester and are hard compared to the polyester.

The microbeads of cellulose acetate are at least partially bordered by voids. The void space in the shaped article should occupy 2–50%, preferably 20–30%, by volume of the shaped article. Depending on the manner in which the supports are made, the voids may completely encircle the microbeads, e.g., a void may be in the shape of a doughnut (or flattened doughnut) encircling a microbead, or the voids may only partially border the microbeads, e.g., a pair of voids may border a microbead on opposite sides.

The invention does not require but permits the use or addition of a plurality of organic and inorganic materials such as fillers, pigments, anti-blocks, anti-stats, plasticizers, dyes, stabilizers, nucleating agents, etc. These materials may be incorporated into the matrix phases, into the dispersed phases, or may exist as separate dispersed phases.

The microvoids form on cooling without requiring nucleating agents. During stretching the voids assume characteristic shapes from the balanced biaxial orientation of paperlike films to be uniaxial orientation of microvoided/satin-like fibers. Balanced microvoids are largely circular in the plane of orientation while fiber microvoids are elongated in the direction of the fiber axis. The size of the microvoids and the ultimate physical properties depend upon the degree and balance of the orientation, temperature and rate of stretching, crystallization kinetics, the size distribution of the microbeads, and the like.

The supports according to this invention are prepared by (a) forming a mixture of molten polyester and cellulose acetate wherein the cellulose acetate is a multiplicity of microbeads uniformly dispersed throughout the polyester, the polyester being as described hereinbefore, the cellulose acetate being as described hereinbefore, (b) forming a shaped article from the mixture by extrusion, casting or molding, (c) orienting the article by stretching to form microbeads of cellulose acetate uniformly distributed throughout the article and voids at least partially bordering the microbeads on sides thereof in the direction, or directions of orientation.

The mixture may be formed by forming a melt of the polyester and mixing therein the cellulose acetate. The cellulose acetate may be in the form of solid or semisolid microbeads, or in molten form. Due to the incompatability between the polyester and cellulose acetate, there is no attraction or adhesion between them, allowing the cellulose acetate to "bead-up" if molten to form dispersed microbeads upon mixing. If solid or semisolid, the microbeads become uniformly dispersed in the polyester upon mixing.

When the microbeads have become uniformly dispersed in the polyester, a shaped article is formed by processes such as extrusion, casting or molding. Examples of extrusion or casting would be extruding or casting a film or sheet. Such forming methods are well known in the art. If sheets or film material are cast or extruded, it is important that such article be oriented by stretching, at least in one direction. Methods of unilaterally or bilaterally orienting sheet or film material are well known in the art. Basically, such methods comprise stretching the sheet or film at least in the machine or longitudinal direction after it is cast or extruded by an amount of about 1.5–10 (usually 3–4) times its original dimension. Such sheet or film may also be stretched in the transverse or cross-machine direction by apparatus and methods well known in the art, in amounts of generally 1.5–10 (usually 3–4) times the original dimension. Such apparatus and methods are well known in the art—e.g., they are described in such U.S. Pat. Nos. 3,903,234, incorporated herein by reference.

The voids, or void spaces, referred to herein surrounding the microbeads are formed as the polyester continuous matrix is stretched at a temperature between the polyester Tg and the cellulose acetate Tg. The microbeads of cellulose acetate are relatively hard compared to the polyester continuous matrix. Also, due to the incompatability and immiscibility between the cellulose acetate and the polyester, the polyester continuous matrix slides over the microbeads as it is stretched, causing voids to be formed at the sides in the direction or directions of stretch, which voids elongate as the polyester matrix continues to be stretched. Thus, the final size and shape of the voids depends on the direction(s) and amount of stretching. If stretching is only in one direction, microvoids will form at the sides of the microbeads in the direction of stretching. If stretching is in two directions (bidirectional stretching), in effect such stretching has vector components extending radially from any given position to result in a doughnut-shaped void surrounding each microbead.

The preferred preform stretching operation simultaneously opens the microvoids and orients the matrix material. The final product properties depend on and can be controlled by stretching time-temperature relationships and on the type and degree of stretch. For maximum opacity and texture, the stretching is done just above the glass transition temperature of the matrix material. When stretching is done in the neighborhood of the higher glass transition temperature, both phases stretch together and opacity decreases. In the former case, the materials are pulled apart, a mechanical anti-compatibilization process. In the latter case, they are drawn together, a mechanical compatibilization process. Two examples are high-speed melt spinning of fibers and melt blowing of fibers and films to form non-woven/spun-bonded products. In summary, the scope of this invention includes the complete range of forming operations just described.

In general, void formation occurs independent of, and does not require, crystalline orientation of the matrix phase. Opaque, microvoided films have been made in accordance with the methods of this invention using completely amorphous, non-crystallizing copolyesters as the matrix phase. Crystallizable/orientable (strain hardening) matrix materials are preferred for some properties like tensile strength and barrier effectiveness. On the other hand, amorphous matrix materials have special utility in other areas like tear resistance and heat sealability. The specific matrix composition can be tailored to meet any product needs. The complete range from crystalline to amorphous matrix materials is part of the invention.

Stretching experiments reveal that increasing the cellulose ester content of the blends reduces the effective natural draw ratio relative to that of the matrix material and raises the effective orientation or draw temperature. When melt casting these films, required casting roll temperature increases with cellulose ester content. Minimal cooling below the orientation temperature prior to stretching is preferred since the cooled preform state is often brittle, the brittleness increasing with cellulose ester content.

The following examples are submitted for a better understanding of the invention.

In the examples the specified materials were combined and mixed in a dry state prior to extrusion. Most of the materials used in these examples are granules (ground through a 2 millimeter screen) and fine powders. This form permits good dry blending without separation during processing. In most cases, the mixed materials were dried under vacuum conditions with nitrogen bleed to carry off the volatiles. Of course, when substantial amounts of low-melting materials were used, separate drying was done, followed by mixing and immediate extrusion. The relative amounts of the polyester, cellulose ester, and other materials are indicated by mass ratios; and all percents are weight %. During extrusion, the materials are melted and mixed as viscous melts. Shear emulsification of the immiscible melts was enhanced with a mixing section centrally located in the metering section of the extruder screw. Residence time was kept small by design; for example, screw L/D was 24:1 [Killion 1.25 inch (31.8 mm) extruder] and the dies were joined directly to the extruder via small-sized adaptors. The extrudate is quenched to form flat films or sheet. The required orientation was carried out by conventional equipment and methods associated with the specific forming operation.

EXAMPLES OF STRETCH CAVITATION MICROVOIDED SUPPORTS

The following are specific examples illustrating the preparation of stretch cavitation microvoided articles suitable for use as supports for the intensifying screens of this invention.

EXAMPLE 1

Blends were prepared with a polyester and a cellulose acetate. The polyester is Polyester A (described below) and the cellulose ester is cellulose acetate CA-398-30. Two blends (80/20) and (90/10) were melt cast to form sheets between 15 to 20 mils (381 to 508 microns) thick. These sheets were simultaneously stretched 4× (a multiple of 4) in both directions to form white, paper-like films just over 1 mil (25.4 microns) thick. The films of this invention are highly diffuse reflective over the visible spectrum and remain highly reflective in the near UV (300 to 400 nanometer wavelengths) region. Typical films properties and processing conditions are given below.

EXAMPLE 2 (Control)

This example is an example of prior art. It is given here for direct comparison with Example 1. Blends were prepared with the same polyester as Example 1 and inorganic materials. The inorganics are titanium dioxide (Rutile R-100) and calcium carbonate (Microwhite 25). A (90/10) blend of the polyester and each of the inorganics was melt cast to form sheets between 15 to 20 mils (381 to 508 microns) thick. These sheets were simultaneously stretched 4× in both directions to form white, plastic-like films just over 1 mil (25.4 microns) thick. Typical film properties and processing conditions are given below.

EXAMPLE 3

Blends were prepared with a polyester and a cellulose acetate. The polyester is a blend of Polyester A and Polyester A containing a covalently bound colorant. The cellulose acetate is CA-398-30. Two (80/20) blends (one containing 0.5% red moiety and one containing 0.5% blue moiety) were melt cast to form sheets 20 mils (508 microns) thick. These sheets were simultaneously stretched 4× in both directions to form pastel-colored, paper-like films about 1.75 mils (44.5 microns) thick. Typical film properties and processing conditions are given below.

EXAMPLE 4

Blends were prepared with a polyester and a mixed cellulose ester, cellulose acetate propionate. The polyester is Polyester A and the cellulose ester is CAP-482-20. This (90/10) blend and a (90/10) blend made like Example 1 were melt cast to form sheets 15 mils (381 microns) thick. These sheets were simultaneously stretched 4× in both directions to form translucent, paper-like films about 1 mil (25.4 microns) thick. Typical film properties and processing conditions are given below.

EXAMPLE 5

Blends were prepared with the same polyester and cellulose acetate as Example 1. The specific blends (95/5), (90/10), (85/15), (80/20), (75/25), and (70/30) were melt cast to form sheets 25 mils (635 microns) thick. Extrusion conditions were similar to those of Example 1. These sheets were simultaneously stretched 3× in both directions to form white, paper-like films 3 mils (76.2 microns) thick. These sheets were also simultaneously stretched 4× in both directions to form white, paper-like films 2 mils (50.8 microns) thick. Typical film optical properties are given below.

EXAMPLE 6

This example shows that light-colored, opaque structures developed when the dispersed phase was colored. The polyester of Example 1 was mixed with a cellulose acetate (CA-320S, containing a covalently bonded colorant). A (90/10) blend (containing 0.13% red moiety) was melt cast to form sheets 15 mils (381 microns) thick. These sheets were stretched as in Example 1 yielding uniformly pastel-red, opaque, paper-like films.

EXAMPLE 7

This example shows that lower viscosity polyesters containing minor amounts of additives yielded products of this invention. A blend was prepared with a polyester and a cellulose acetate. The polyester is Polyester B (described below) and the cellulose acetate is CA-398-30. A (90/10) blend was melt cast to form sheets between 15 to 20 mils (381 to 508 microns) thick. A Brabender ¾-inch (19-mm) laboratory extruder without a mixing screw was used at 110 RPM and 260° C. (melt temperature). These sheets were simultaneously stretched 4× in both directions to form white, paper-like films just over 1 mil (25.4 microns) thick. These films contained visible particles of cellulose acetate resulting from the incomplete shear emulsification on this machine.

EXAMPLE 8

This example shows that white, opaque properties developed over a range of stretching conditions. A (90/10) blend of the same materials as Example 1 was melt cast using the equipment of Example 6. Stretching conditions were (2×1), (2×2), (3×1), (3×2), (3×3), (4×1), (4×2), (4×3) and (4×4). Whiteness and opacity were visually evident at all levels of stretching, increasing with balance and degree of stretch.

EXAMPLE 9

This example illustrates that polyester/polyester blends can be used with cellulose acetates to produce articles of this invention. The specific blends of this example are (65/25/10) and (65/15/20) using Polyester A, Polyester C, and CA-398-30 respectively. Films were made as in Example 1, and the resulting properties were similar. The films of this example, however, were more flexible due to the presence of the thermoplastic elastomer in the blend.

EXAMPLE 10

Blends were prepared with a polyester and a cellulose acetate. The polyester is Polyester A and the cellulose acetate is CA-394-60S. The following blends (95/5), (90/10), (85/15), and (80/20) were melt extruded and simultaneously biaxially oriented on a laboratory blown film line. The oriented tubes had a layflat width of 9 to 12 inches (22.9 to 30.5 centimeters), and the film thickness was about 0.5 mil (12.7 microns). These films were white, opaque, and had tissue paper qualities. Typical film properties and processing conditions are given below.

EXAMPLE 11

Blends were prepared with a polyester and a cellulose acetate. The polyester is a blend of Polyester A and Polyester A containing a covalently bound colorant. The cellulose acetate is CA-398-30. Four (80/20) blends were melt extruded and simultaneously biaxially oriented as in Example 10. Typical film properties and processing conditions are given below.

EXAMPLE 12

A (90/10) blend was prepared with a higher glass transition polyester, Polyester D, and a cellulose acetate (CA-394-60S). This blend was melt extruded at a melt temperature of 270° C. and simultaneously biaxially oriented at about 140° C. as in Example 10. The resulting film was white, opaque, and paper-like. This blend system is especially attractive if high temperature resistant products are being manufactured.

EXAMPLE 13

The blends of this example were prepared from a polyester, a polypropylene, and a cellulose acetate. The polyester is Polyester A; the polypropylene homopolymer is PP 4230; and the cellulose acetate is CA-394-60S. Three blends (70/10/20), (75/5/20), and (77/3/20) were melt extruded and simultaneously biaxially oriented as in Example 10. White, opaque, paper-like films were made, however film strength and quality decreased as the level of polypropylene increased.

EXAMPLE 14

A (90/10) blend was prepared with a polyester, Polyester A, and a cellulose triacetate CA-436-80S. This blend was melt extruded at a melt temperature of 275° C. and simultaneously biaxially oriented as in Example 10. White, opaque, paper-like films were made, however the quality of the film was degraded by the presence of small particles of incompletely melted cellulose triacetate.

EXAMPLE 15

Blends were prepared with a polyester, Polyester A, a water-dispersible polyester, and a cellulose acetate (CA-398-30). The blend was melt extruded and simultaneously biaxially oriented as in Example 10. The white, opaque, paper-like films were of good quality, with an enhanced hydrophilic character due to the presence of the hydrophilic polyester.

EXAMPLE 16

A (90/10) blend of an amorphous copolyester and a cellulose acetate was prepared. The copolyester was Polyester E, and the cellulose acetate was CA-394-60S. The blend was melt extruded and simultaneously biaxially oriented as in Example 10; however the white, opaque, paper-like films had a faint, yellowish tint, indicating greater thermal degradation.

EXAMPLE 17

A (90/10) blend of another copolyester and a cellulose acetate was prepared. The copolyester was Polyester F and the cellulose acetate was CA-398-30. The blend was melt extruded and simultaneously biaxially oriented as in Example 10. A good quality, white, opaque, paper-like film resulted.

EXAMPLE 18

A (90/10) blend was prepared from a polyester, Polyester A, and a lower viscosity cellulose acetate (CA-398-3). A second (90/10) blend of this polyester with a lower percent acetyl cellulose acetate (CA-320S) was also prepared. Both blends were melt extruded and simultaneously biaxially oriented as in Example 10. Good quality, white, opaque, paper-like films resulted.

EXAMPLE 1

Typical Cast & Tentered Film Properties For 80/20 and 90/10 Polyester/Cellulose Acetate

| | Material | |
|---|---|---|
| | (80) Polyester A (20) CA-398-30 | (90) Polyester A (10) CA-398-30 |
| Melt Temp., °C. | 260 | 262 |
| Screw Speed (rpm) | 50 | 50 |
| Cast Roll Temp., °C. | 82 | 58 |
| Cast Roll Speed (fpm) | 6.0 (1.83 meters/min) | — |
| Stretch Temp., °C. | 120 | 110 |
| Film Thickness (mil) | 1.37 (34.8 microns) | 1.17 (29.7 microns) |
| Inherent Visc. (dl/g) | 0.590 | 0.623 |
| Density (g/cc) | 1.023 | 1.303 |
| Tensile Yield ($10^3$ psi)(mPa)* | 7.40/6.67 (51.0/46.0) | 12.8/12.6 (88.3/86.9) |
| Tensile Break ($10^3$ psi) | 10.4/8.74 (71.7/60.3) | 23.5/22.4 (162/154) |
| Elongation to Break (%) | 70/61 | 92/77 |
| Oxygen Transmission (cc-mil/100 $in^2$24-hr-atm) | 16.0 (6.30) | 9.54 (3.76) |

$\frac{(liter)(micron)}{(m^2)(24\ hr)(atm)}$

Kubelka-Munk Analysis

-continued

| | Material | |
|---|---|---|
| | (80) Polyester A (20) CA-398-30 | (90) Polyester A (10) CA-398-30 |
| (560 nm): | | |
| Scattering SX | 3.644 | 2.308 |
| Absorption KX | 0.002x | 0.002x |
| Transmittance T(i) | 0.214 | 0.302 |
| Reflectance R(inf) | 0.966 | 0.966 |
| Opacity | 0.812 | 0.722 |

*megaPascals

EXAMPLE 2

Cast and Tentered Film Properties For 90/10 Polyester/Inorganic Filler

| | Material | |
|---|---|---|
| | (90) Polyester A (10) Rutile R-100 | (90) Polyester A (10) Microwhite 25 |
| Melt Temp., °C. | 263 | 263 |
| Screw Speed (rpm) | 50 | 50 |
| Cast Roll Temp., °C. | 42 | 50 |
| Cast Roll Speed (fpm) | — meter/min | — |
| Stretch Temp., °C. | 110 | 110 |
| Film Thickness (mil) | 1.13 (28.7 microns) | 1.33 (33.8 microns) |
| Inherent Visc. (dl/g) | 0.563 | 0.573 |
| Density (g/cc) | 1.432 | 1.323 |
| Tensile Yield ($10^3$ psi)(mPa)* | 11.3/12.0 (77.9/82.7) | 10.8/11.2 (74.5/77.2) |
| Tensile Break ($10^3$ psi) | 18.6/20.3 (128/140) | 16.5/17.7 (114/122) |
| Elongation to Break (%) | 103/100 | 73/71 |
| Oxygen Transmission (cc-mil/100 in$^2$24-hr-atm) | 8.72 (3.43) | 10.2 (4.02) |
| $\frac{\text{(liter)(micron)}}{\text{(m}^2\text{)(24 hr)(atm)}}$ | | |
| Kubelka-Munk Analysis (560 nm): | | |
| Scattering SX | 2.310 | 1.115 |
| Absorption KX | 0.005x | 0.008x |
| Transmittance T(i) | 0.300 | 0.468 |
| Reflectance R(inf) | 0.936 | 0.886 |
| Opacity | 0.742 | 0.591 |

*megaPascals

EXAMPLE 3

For 75/5/20 Polyester/Red Polyester/Cellulose Acetate 75/5/20 Polyester/Blue Polyester/Cellulose Acetate

| | Material | |
|---|---|---|
| | (75) Polyester A (5) Polyester A (Red) (20) CA-398-30 | (75) Polyester A (5) Polyester A (Blue) (20) CA-398-30 |
| Melt Temp., °C. | 260 | 260 |
| Screw Speed (rpm) | 50 | 50 |
| Cast Roll Temp., °C. | 82 | 82 |
| Cast Roll Speed (fpm) | 6.0 (1.83 meters/min) | 6.0 (1.83 meters/min) |
| Stretch Temp., °C. | 120 | 125 |

-continued

| | Material | |
|---|---|---|
| | (75) Polyester A (5) Polyester A (Red) (20) CA-398-30 | (75) Polyester A (5) Polyester A (Blue) (20) CA-398-30 |
| Film Thickness (mil) | 1.78 (45.2 microns) | 1.75 (44.4 microns) |
| Inherent Visc. (dl/g) | 0.640 | 0.672 |
| Density (g/cc) | 0.889 | 0.895 |
| Tensile Yield ($10^3$ psi)(mPa)* | 6.19/6.00 (42.7/41.4) | 4.97/4.92 (34.3/33.9) |
| Tensile Break ($10^3$ psi) | 8.10/7.75 (55.8/53.4) | 5.78/5.38 (39.9/37.1) |
| Elongation to Break (%) | 50/42 | 41/23 |
| Oxygen Transmission (cc-mil/100 in$^2$24-hr-atm) | 18.4 (7.24) | 21.8 (8.58) |
| $\frac{\text{(liter)(micron)}}{\text{(m}^2\text{)(24 hr)(atm)}}$ | | |
| Kubelka-Munk Analysis (560 nm): | | |
| Scattering SX | 5.571 | 6.530 |
| Absorption KX | 2.332x | 2.408x |
| Transmittance T(i) | 0.003 | 0.000 |
| Reflectance R(inf) | 0.413 | 0.434 |
| Opacity | 1.000 | 1.000 |

*megaPascals

EXAMPLE 4

Cast and Tentered Film Properties For 90/10 Polyester/Cellulose Acetate and 90/10 Polyester/Cellulose Acetate Propionate

| | Material | |
|---|---|---|
| | (90) Polyester A (10) CA-398-30 | (90) Polyester A (10) CAP-482-20 |
| Melt Temp., °C. | 264 | 264 |
| Screw Speed (rpm) | 50 | 50 |
| Cast Roll Temp., °C. | 49 | 49 |
| Cast Roll Speed (fpm) | 6.0 (1.83 meters/min) | 6.0 (1.83 meters/min) |
| Stretch Temp., °C. | 105 | 115 |
| Film Thickness (mil) | 1.03 (26.2 microns) | 0.94 (23.9 microns) |
| Inherent Visc. (dl/g) | 0.603 | 0.665 |
| Density (g/cc) | 1.192 | 1.364 |
| Tensile Yield ($10^3$ psi)(mPA)* | 13.5/13.7 (93.1/94.5) | 15.9/15.1 (111/104) |
| Tensile Break ($10^3$ psi) | 25.5/25.9 (176/179) | 29.0/29.2 (200/201) |
| Elongation to Break (%) | 84/78 | 103/108 |
| Oxygen Transmission (cc-mil/100 in$^2$24-hr-atm) | 8.01 (3.15) | 7.34 (2.89) |
| $\frac{\text{(liter)(micron)}}{\text{(m}^2\text{)(24 hr)(atm)}}$ | | |
| Kubelka-Munk Analysis (560 nm): | | |
| Scattering SX | 2.397 | 0.398 |
| Absorption KX | 0.006x | 0.006x |
| Transmittance T(i) | 0.292 | 0.711 |
| Reflectance R(inf) | 0.930 | 0.848 |
| Opacity | 0.756 | 0.334 |

*megaPascals

EXAMPLE 5

KUBELKA-MUNK ANALYSES

| Polyester Cellulose Acetate (Mass Ratio) | Stretch Ratios (X × Y) | Stretch Temp., °C. | Reheat Time (Sec) | Thickness (Mils) | Thickness (Microns) | Kubelka-Munk Values SX | KX | T(i) | R∞ | Opacity |
|---|---|---|---|---|---|---|---|---|---|---|
| 99/1 | 3 × 3 | 100 | 45 | 2.7 | 68.6 | 0.201 | 0.012X | 0.822 | 0.710 | 0.233 |
| 98/2 | 3 × 3 | 100 | 45 | 2.8 | 71.1 | 0.272 | 0.014X | 0.775 | 0.730 | 0.289 |
| 95/5 | 3 × 3 | 100 | 60 | 2.9 | 73.7 | 0.861 | 0.013X | 0.529 | 0.838 | 0.545 |
| 90/10 | 3 × 3 | 100 | 75 | 3.2 | 81.3 | 2.611 | 0.014X | 0.271 | 0.901 | 0.794 |
| 85/15 | 3 × 3 | 100 | 75 | 3.7 | 94.0 | 6.484 | 0.015X | 0.128 | 0.933 | 0.917 |
| 80/20 | 3 × 3 | 100 | 75 | 4.0 | 102 | 11.892 | 0.013X | 0.073 | 0.954 | 0.958 |
| 75/25 | 3 × 3 | 100 | 60 | 3.4 | 86.4 | 12.126 | 0.016X | 0.071 | 0.950 | 0.961 |
| 70/30 | 3 × 3 | 110 | 75 | 5.2 | 132 | 19.160 | 0.015X | 0.045 | 0.961 | 0.978 |
| 75/25 | 3.5 × 3.5 | 115 | 60 | 2.7 | 68.6 | 7.262 | 0.012X | 0.117 | 0.945 | 0.922 |
| 70/30 | 3.5 × 3.5 | 115 | 60 | 5.0 | 127 | 21.990 | 0.012X | 0.040 | 0.967 | 0.980 |
| 99/1 | 4 × 4 | 110 | 60 | 1.6 | 40.6 | 0.195 | 0.011X | 0.828 | 0.719 | 0.224 |
| 98/2 | 4 × 4 | 110 | 60 | 1.6 | 40.6 | 0.260 | 0.011X | 0.785 | 0.749 | 0.273 |
| 95/5 | 4 × 4 | 110 | 60 | 1.8 | 45.7 | 0.745 | 0.010X | 0.567 | 0.851 | 0.497 |
| 90/10 | 4 × 4 | 110 | 60 | 2.1 | 53.3 | 2.583 | 0.010X | 0.274 | 0.914 | 0.782 |
| 85/15 | 4 × 4 | 115 | 60 | 2.0 | 50.8 | 4.076 | 0.009X | 0.193 | 0.937 | 0.851 |
| 80/20 | 4 × 4 | 115 | 45 | 2.7 | 68.6 | 9.699 | 0.011X | 0.090 | 0.954 | 0.943 |
| 70/30 | 4 × 4 | 120 | 120 | 5.8 | 147 | 22.634 | 0.015X | 0.037 | 0.964 | 0.983 |

EXAMPLE 10

BLOWN FILM PROPERTIES

| Material or Blend | (95) Polyester A (5) CA-394-60S | (90) Polyester A (10) CA-394-60S | (85) Polyester A (15) CA-394-60S | (80) Polyester A (20) CA-394-60S |
|---|---|---|---|---|
| Extruder Melt Temp., °C. | 255 | 254 | 260 | 260 |
| Extruder Pressure, psig | 1400 | 1400 | 1500 | 1400 |
| (megaPascals) | (9.66) | (9.66) | (10.34) | (9.66) |
| Extruder Screw (rpm) | 40 | 40 | 50 | 50 |
| NIP Speed, ft/min | 46 | 46 | 43 | 51 |
| (meters/min) | (14.0) | (14.0) | (13.1) | (15.5) |
| Film Thickness, mil | 0.49 | 0.49 | 0.59 | 0.48 |
| (microns) | (12.4) | (12.4) | (15.0) | (12.2) |
| Area Weight, grams/sq ft | 1.71 | 1.60 | 2.01 | 1.27 |
| [grams/(meter)$^2$] | (18.4) | (17.2) | (21.6) | (13.7) |
| Density (sp.gr.) | 1.301 | 1.302 | 1.208 | 1.120 |
| Yield Stress, $10^3$ psi (MD/TD)* | 8.6/7.6 | 7.8/5.9 | 5.3/7.4 | 5.1/6.4 |
| (megaPascals or mPa) | (59.3/52.4) | (53.8/40.7) | (36.5/51.0) | (35.2/44.1) |

*(Machine Direction/Transverse Direction)

EXAMPLE 11

BLOWN FILM PROPERTIES

| | Material or Blend | | | |
|---|---|---|---|---|
| | (80) Polyester A (20) CA-398-30 | (75) Polyester A (5) Polyester A (Yellow) (20) CA-398-30 | (75) Polyester A (5) Polyester A (Red) (20) CA-398-30 | (80) Polyester A (5) Polyester A (Blue) (20) CA-398-30 |
| Extruder Melt Temp., °C. | 255 | 255 | 256 | 257 |
| Extruder Pressure, psig | 1400 | 1400 | 1400 | 1400 |
| (megaPascals) | (9.66) | (9.66) | (9.66) | (9.66) |
| Extruder Screw, rpm | 50 | 50 | 50 | 50 |
| (meters/min) | (15.5) | (15.5) | (15.5) | (15.5) |
| NIP Speed (ft/min) | 51 | 51 | 51 | 51 |
| Film Thickness, mil | 0.60 | 0.53 | 0.49 | 0.48 |
| (microns) | (15.2) | (13.5) | (12.4) | (12.2) |
| Area weight, grams/sq ft | 1.84 | 1.57 | 1.53 | 1.44 |
| [grams/(meter)$^2$] | (19.8) | (16.9) | (16.5) | (15.5) |
| Inherent Viscosity (dl/gm) | 0.629 | 0.650 | 0.660 | 0.657 |
| Density (sp. gr.) | 1.143 | 1.143 | 1.109 | 1.117 |
| Yield Stress, $10^3$ psi (MD/TD) | 8.8/7.2 | 9.1/8.2 | 8.1/7.6 | 8.0/7.6 |
| (megaPascals) | (60.7/49.6) | (62.7/56.5) | (55.8/52.4) | (55.2/52.4) |
| Oxygen Transmission (cc-mil/100 in$^2$-24 hr-atm) | 11.5 | 12.2 | 11.7 | 11.8 |
| $\frac{\text{(liter)(micron)}}{\text{(m}^2\text{)(24 hr)(atm)}}$ | (4.53) | (4.80) | (4.61) | (4.65) |

Polyester A is described as follows:

Reaction Product Of:
Dicarboxylic acid(s): or Ester Thereof: dimethyl terephthalate
Glycol(s): ethylene glycol
I.V.: 0.70
Tg: 80° C.
Tm: 255° C.

Polyester B is described as follows:

Reaction Product Of:
Dicarboxylic acid(s) or Ester Thereof: dimethyl terephthalate
Glycol(s): ethylene glycol
I.V.: 0.64
Tg: 80° C.
Tm: 255° C.

Polyester C is described as follows:

Reaction Product Of:
Dicarboxylic acid(s) or Ester Thereof: 99.5 mol %, 1,4-cyclohexanedicarboxylic acid, 0.5 mol % trimellatic anhydride
Glycol(s): 91.1 mol % 1,4-cyclohexanedimethanol 8.9 mol % poly(tetramethylene ether glycol)
I.V.: 1.05
Tg: below 0° C.
Tm: 200° C.

Polyester D is described as follows:

Reaction Product Of:
Dicarboxylic acid(s) or Ester Thereof: Naphthalene dicarboxylic acid
Glycol(s): ethylene glycol
I.V.: 0.80
Tg: 125° C.
Tm: 265° C.

Polyester E is described as follows:

Reaction Product Of:
Dicarboxylic acid(s) or Ester Thereof: terephthalic acid
Glycol(s): 69 mol % ethylene glycol 31 mol % 1,4-cyclohexanedimethanol
I.V.: 0.75
Tg: 80° C.
Tm: amorphous Polyester F is described as follows:

Reaction Product Of:
Dicarboxylic acid(s) or Ester Thereof: 75 mol % terephthalic acid 25 mol % trans-4,4'-stilbene dicarboxylic acid
Glycols: ethylene glycol
I.V.: 0.8
Tg: 95° C.
Tm: 215° C.

The cellulose acetates, designated as "CA" are as defined in the table above.

Where ratios or parts are given, e.g., 80/20, they are parts by weight, with the polyester weight specified first.

The following applies to Kubelka-Munk values:

SX is the scattering coefficient of the whole thickness of the article and is determined as follows:

$$SX = \frac{1}{b}\ \text{Ar ctgh}\,\frac{a-R}{b} - \text{Ar ctgh}\,\frac{a-Rg}{b}$$

wherein:

$b=(a^2-1)^{\frac{1}{2}}$

Ar ctgh is the inverse hyperbolic cotangent $$a = \tfrac{1}{2}R + \frac{Ro - R + Rg}{RoRg}$$

Ro is reflectance with black tile behind sheet
R is reflectance with white tile behind sheet
Rg is reflectance of a white tile=0.89

KX is the absorption coefficient of the whole thickness of the article and is determined as follows:

$$KX=SX(a-1)$$

wherein SX and a are as defined above.

R (infinity) is the reflectance of an article if the article was so thick that additional thickness would not change it and is determined as follows:

$$R\ (\text{infinity})=a-(a^2-1)^{\frac{1}{2}}$$

wherein a is as defined above.

Ti is the internal light transmittance and is determined as follows:

$$Ti=[(a-Ro)^2-b^2]^{\frac{1}{2}}$$

Opacity=

$$\frac{Ro}{Rg}$$

wherein Ro and Rg are as defined above.

In the above formulae, Ro, R and Rg are determined in a conventional manner using a Diano Match-Scan II Spectrophotometer (Milton Roy Co.) using a wavelength of 560 nanometers. Also above, X in the formulae SX and KX is the thickness of the article. A full description of these terms is found in "Business, Science and Industry" 3rd Edition, by Deane B. Judd and Gunter Wyszecki, published by John Wiley & Sons, N.Y. (1975), pages 397–439, which is incorporated herein by reference.

Glass transition temperatures, Tg, and melt temperatures, Tm, are determined using a Perkin-Elmer DSC-2 Differential Scanning Calorimeter.

In the examples, physical properties are measured as follows:

Tensile Strength at Yield: ASTM D882
Tensile Strength at Break: ASTM D882
Elongation at Break: ASTM D882

Unless otherwise specified inherent viscosity is measured in a 60/40 parts by weight solution of phenol/tetrachloroethane 25° C. and at a concentration of 0.5 gram of polymer in 100 mL of the solvent.

Where acids are specified herein in the formation of the polyesters or copolyesters, it should be understood that ester forming derivatives of the acids may be used rather than the acids themselves as is conventional practice. For example, dimethyl isophthalate may be used rather than isophthalic acid.

In the examples, oxygen permeability is determined according to ASTM D 3985, in cubic centimeters permeating a 1 mil (25.4 μm) thick sample, 100 inches square (approx. 64,500 $cm^2$), for a 24-hour period under oxygen partial pressure difference of one atmosphere at 30° C. using a MOCON Oxtran 10-50 instrument. Oxygen permeability is also given in S.I. (Systems International) units in cubic centimeters permeating a 1 cm. thick sample, 1 cm. square, for 1 second at atmospheric pressure.

Unless otherwise specified, all parts, ratios, percentages, etc. are by weight.

While the foregoing description of stretch cavitation microvoided supports has been directed specifically to the preferred supports satisfying the teachings of Pollock et al, it is appreciated that other conventional cavitation microvoided supports can be employed as supports for the intensifying screens of this invention. These supports are illustrated by Johnson U.S. Pat. No. 3,154,461, Takashi et al U.S. Pat. No. 4,318,950; Toyoda et al U.S. Pat. No. 4,430,639; Ashcraft et al U.S. Pat. Nos. 4,377,616 and 4,438,175; H. H. Morris and P. I. Prescott, "White Opaque Plastic Film and Fiber for Papermaking Use," ACS Div. Org. Coatings Plastic Chemistry, Vol. 34, pp. 75–80, 1974; Mathews et al U.S. Pat. Nos. 3,944,699 and 4,187,113; and Remmington et al U.K. Patent Specifications 1,593,591 and 1,593,592, cited above, the disclosures of which are incorporated by reference.

SUPPORTS WITH ORIENTED MICROCELLS

Reflective lenslet supports for the intensifying screens of this invention can also be formed from extruded or cast articles, such as sheets or film, that contain closed microcells and are tentered to flatten and thereby orient the microcells with major axes extending in the directions of tentering, similarly as the stretch cavitation microvoided supports described above. In this form the support is comprised of polymeric continuous phase or matrix, which can be identical to that of the stretch cavitation microvoided supports described above. However, as extruded the support need contain no microbeads. Instead the support contains a blowing agent—that is, an agent capable of generating a dispersed entrapped gas phase (microcells) in the continuous phase during or immediately following extrusion or casting. The entrapped dispersed gas phase forms spherical voids in the support. Tentering the support flattens the voids to the flattened spheroidal shape required for reflection of emitted radiation. The pressure exerted by the entrapped gas prevents collapse of the lenslets and obviates any necessity of incorporating microbeads, either for the generation or maintenance of the lenslets.

When the voids in the support have a lower index of refraction than the surrounding continuous phase, they are not useful as reflection lenslets in their initially formed spherical form. Rather, in this instance, when the dispersed gas phase forms spherical microcells (bubbles), the emitted radiation will be scattered and no lens action contributing to increased sharpness occurs.

HIGHER REFRACTIVE INDEX LENSLETS

In the foregoing embodiments the lenslets themselves have a low refractive index of approximately 1.0, typical of vacuum and gases, while the surrounding continuous phase has a higher refractive index typical of polymeric materials. Most common organic polymers exhibit refractive indices in the range from about 1.4 to 1.6. The mismatch between the refractive index of the continuous polymer phase or matrix and the microvoid or entrapped gas bubble (microcell) is essential to the function of a lenslet. However, there is no reason that the discrete, dispersed phase must have a lower refractive index that the surrounding continuous phase for lens effects to be obtained.

In an alternate form of the invention the discrete dispersed phase can take the form of any convenient material transparent to emitted radiation. It is preferred that the dispersed phase also be substantially transparent to X-radiation, but this is not essential when the intensifying screen is to be employed as a back screen.

In a specifically contemplated form of the invention the material or microvoid forming the lenslets described above can be replaced by microbeads having the noted transparency and a refractive index at least 0.2, preferably at least 0.5, higher than that of the surrounding continuous phase. For example, glass microbeads having refractive indices in the range of from about 1.5 to 2.5 or higher can be conveniently dispersed in the continuous polymeric phase to form the reflective lenslet support.

The higher refractive index microbeads can be spherical. In this instance no orientation of the microbeads is possible or required. Instead of forming the microbeads of spherical form, they can be spheroidal—e.g., similar in shape to either the microvoids or bubbles employed as a dispersed phase described above. Biaxial tentering of the support can be relied upon to align nonspherical microbeads with their major axes parallel to a major surface of the support (and hence the fluorescent layer) just as described above to align the lower index of refraction dispersed phase lenslets.

A significant advantage of employing spherical microbeads is that no tentering of the support is required. Thus, the use of spherical microbeads is well suited to casting the microbeads in the continuous polymeric phase on a previously formed substrate portion of the support. Viewed one way, the spheres require no special alignment step or, viewed another way, the spheres are always properly aligned to act as light reflecting lenslets.

A distinct advantage of employing a higher index of refraction discrete phase to form the lenslets is that such materials can be relied upon to enhance the physical strength of the support. Consequently, both the occurrence frequency and size restrictions that must be observed to preserve the physical integrity of a support relying on microvoids or microcells for lenslet fabrication are not relevant. Rather, it is specifically contemplated that the microbeads can be employed up to their maximum packing density consistent with retaining a continuous surrounding continuous phase. For spherical and spheriodal microbeads the geometrical relationship of the microbeads allows a surrounding continuous phase to be maintained even when the microbeads are contiguously packed.

It is specifically contemplated to employ microbeads for lenslet construction that exceed the thickness of the surrounding continuous polymeric phase or matrix. Cast reflective lenslet support layer portions are specifically contemplated to contain microbeads that extend up to 50 percent, preferably up to about 20 percent, above the surface of the surrounding polymeric matrix to enhance adhesion of the fluorescent layer to the support. However, for extruded reflective lenslet supports the longest dimension of the microbeads should be less than, preferably less than 50 percent, that of the overall thickness of the support.

Although it is possible to employ microbeads of a size larger than the lower index of refraction lenslets for the reasons noted above, for the highest achievable point to point uniformity in imaging it is generally preferred that the microbeads be restricted to the micrometer size ranges described above in connection with the microvoids and microbeads employed for producing stretch cavitation microvoided supports.

Although the microbeads are described above as being spherical or spheroidal, it is appreciated that many regular and irregular polyhedral particles, such as those produced by crystallization, approximate spherical or spheroidal shapes. A sphere can be viewed as the limiting example of a regular polyhedron having an indeterminate number of faces. Even without rounding of apices dodecahdra and higher faceted polyhedra appear roughly spherical. In practical crystallography, microcrystals often exhibit sufficient rounding of apices with as few as eight faces as to be essentially spherical. In many respects even lower faceted polyhedra, such as tetrahedra, exhibit reflection geometries conducive to lens activity. On the other hand, randomly oriented cubic crystals with distinct facets are not suitable for use as reflective lenslets.

LENSLETS

Figure 12:
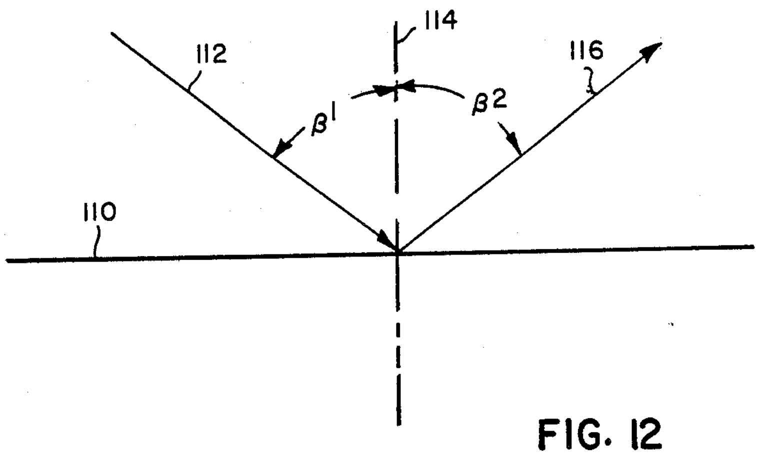
FIGS. 12 and 13 are reflection diagrams.

One of the textbook axioms of optical physics is that when electromagnetic radiation strikes a planar specularly reflective surface (a Lambertion surface), the angle of reflection equals the angle of incidence. This is schematically illustrated in FIG. 12, wherein the reflective surface 110 receives electromagnetic radiation, indicated by arrow 112, at an angle $\beta^1$ measured with respect to an axis 114 normal to the surface, commonly referred to as the surface normal. The angle $\beta^1$ is the angle of incidence. The electromagnetic radiation reflected from the surface, indicated by arrow 116, is oriented at an angle $\beta^2$ with respect the surface normal, referred to as the angle of reflection, which equals the angle of incidence.

As employed herein, the term "lenslet" is defined as a discrete phase (including a microvoid) contained in the continuous polymeric phase of the support which is capable of reducing the angle of reflection ($\beta^2$) in relation to the angle of incidence ($\beta^1$) of emitted longer wavelength electromagnetic radiation received from the fluorescent layer of the intensifying screen. From the foregoing definition it is apparent that the lenslets are in fact lenses. The term "lenslet" rather than "lens" is, however, employed simply to emphasize the limited extent of the major axes of the lenslets in relation to the overall length and breadth of the support. In most instances the minor axis (the axis normal to the fluorescent layer) of a lenslet is less than the thickness of the support, and the ratio of major to minor axes of the lenslets range from about 1:1 (as in the case of a spherical lenslet) to 10:1 (but usually 5:1 or less).

Figure 13:
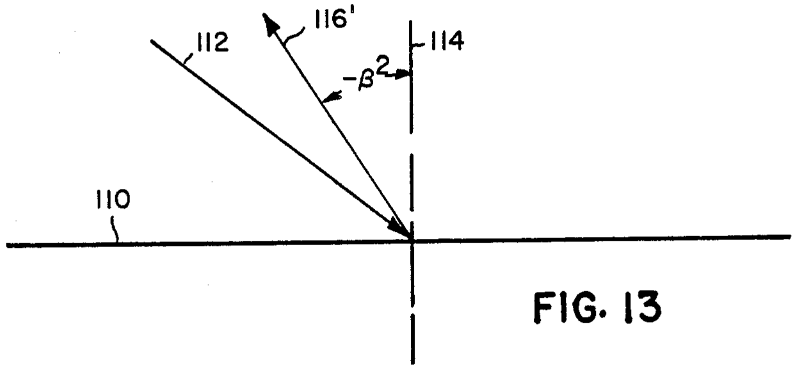

Preferred lenslets are those which not only reduce the angle of reflection, but actually exhibit a negative angle of reflection, $-\beta^2$. This is illustrated schematically in FIG. 13, wherein 110, 112, and 114 illustrate features identical to those of FIG. 12. The sole difference is that the reflected electromagnetic radiation, indicated by the arrow 116' is now oriented between the incident radiation and the surface normal, giving the angle of reflection a negative value, indicated as $-\beta^2$.

The optimum lenslet construction, permitting the highest attainable sharpness in the intensifying screens of this invention, is achieved when the lenslets are retroreflective—that is, capable of directing reflected radiation back toward the fluorescent layer along an axis parallel to the axis of incidence.

Figures 14, 15:
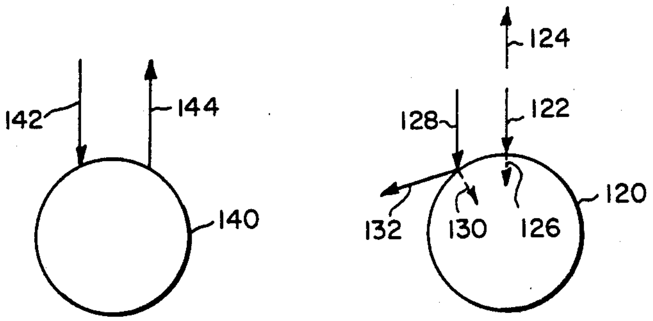
FIGS. 14 and 15 illustrate reflections from selected spheres.

The advantages of the reflective lenslet supports employed in the intensifying screens of this invention as compared to conventional intensifying screen supports relying on white pigment particles for reflection of longer wavelength electromagentic radiation can be appreciated by reference to FIG. 14. A white pigment sphere 120 is shown. Longer wavelength electromagnetic radiation which strikes the sphere along an axis which is aligned with a diameter of the sphere (a diametrical axis), indicated by arrow 122, is mostly retroreflected, as indicated by arrow 124, with a small part being absorbed, as indicated by dashed arrow 126. All of the longer wavelength electromagnetic radiation that strikes the sphere along axes other than diametrical axes (almost all of the incident radiation), indicated by arrow 128, is partially absorbed, as indicated by dashed arrow, 130, but predominantly scattered, as illustrated by arrow 132.

The reason for the absorption of the electromagnetic radiation is that white pigments conventionally employed for support construction, such as titania and barium sulfate, though they appear white, actually absorb radiation over at least a portion of the electromagnetic spectrum. For example, titania exhibits a significant increase in absorption of electromagnetic radiation in moving from the 500 nm (green) region of the spectrum to the 400 nm (blue) and 350 nm (near ultraviolet) regions of the spectrum. Pigments that are commonly referred to as white pigments are in fact not entirely reflective.

In FIG. 14 a single, spherical white pigment particle is shown. In practice, in conventional supports the particles are grains rather than regular spheres, but the optical scattering by the grains is roughly similar. Also, in conventional supports grains are closely packed in a coating or substrate. This results in a higher degree of scattering of electromagnetic radiation back toward the fluorescent layer than is achieved by isolated spheres. The overall effect is of predominant scattering of incident radiation accompanied by significant absorption, particularly in the blue and near infrared portions of the spectrum.

In a preferred form of the present invention the support forming the intensifying screen is comprised of transparent spheres as a dispersed phase in a transparent continuous polymeric phase. As noted above, for the spheres to function as lenslets, it is necessary that the spheres have a higher index of refraction than the surrounding continuous phase. An ideal relationship is shown in FIG. 15, wherein a sphere 140 is shown chosen so that the ratio of its refractive index to that of the surrounding continuous phase, not shown, is exactly two. Longer wavelength electromagnetic radiation striking the sphere, indicated by arrow 142, enters the sphere and is reflected from the sphere, indicated by arrow 144, along an axis that is parallel to the axis of incident radiation. With this relationship of refractive indices the sphere is retroreflective. The longer wavelength electromagnetic radiation reaching the sphere is neither absorbed nor scattered.

For the lenslet dimensions noted above the lateral offset of incident and retroreflected radiation is negligibly small. However, even this small offset can be reduced or eliminated. By increasing the refractive index of the sphere relative to that of the surrounding continuous polymeric medium so that their ratios exceed two, the reflected radiation can actually converge on the axis of incident radiation. In other words, a focused reflection of longer wavelength electromagnetic radiation is possible. On the other hand, if the difference in the refractive indices are less than two, some divergence of the axis of the reflected radiation relative to that of the incident radiation occurs. A preferred useful range of ratios of the higher refractive index of the sphere and the lesser refractive index of the surrounding continuous polymeric phase is from 1.7 (preferably 1.9) to 2.1.

An important point to note is that the spherical lenslets are capable of retroreflection or a close approximation thereof, as described above, regardless of the angle of emission of the longer wavelength electromagnetic radiation from the fluorescent layer. Since fluorescent layers are commonly constructed as turbid layers to inhibit internal lateral scattering of emitted radiation, a large percentage of the longer wavelength electromagnetic radiation striking the spherical lenslets in the support is emitted along axes that are not normal to the fluorescent layer.

It is not possible to substitute for the transparent sphere 140 shown in FIG. 15 an identical transparent sphere (including a spherical microvoid) differing only in that its refractive index is less than that of the surrounding continuous polymeric phase. When this change is made, the sphere becomes a diffuse reflector and its lenslet properties are lost.

If, however, the sphere having a lower refractive index than that of the surrounding continuous polymeric phase is replaced by a spheroid (or microvoid) of the same refractive index and having major axes parallel to the fluorescent layer and having a ratio of major axes to its normal minor axis of at least 1.5:1 (preferably at least 3:1), then lenslet properties are exhibited.

From these simple lenslet constructions, the lenslet properties of microvoids containing microbeads are apparent. When the microbead is a white pigment particle, it functions like a diffuse reflector; however, because it is nearly entirely surrounded by a microvoid, the scattering effects of the pigment particle are more than offset by the lenslet capability of the microvoid.

Nevertheless, it is apparent that the preferred optical choice of microbeads for incorporation in microvoids is a transparent sphere or a transparent particle. In this instance the surrounding microvoid and the transparent microbead work together as lenslets, each making a significant contribution toward reduction of scattering of longer wavelength electromagnetic radiation.

FLUORESCENT LAYERS

An enhancement in performance, taking into account both speed and sharpness, of any conventional intensifying screen containing a reflective support can be realized by substituting a reflective lenslet support as described above. It is therefore apparent that the fluorescent layer can take the form of any conventional fluorescent layer heretofore employed in an intensifying screen in combination with a reflective support. What is surprising is that the reflective lenslet supports, particularly the retroreflective supports, can beneficially replace the support in any conventional intensifying screen, including conventional screens with absorbing and transparent supports.

While any conventional fluorescent layer can be employed in the intensifying screens of this invention, it is preferred to improve further the speed and sharpness characteristics of these intensifying screens by choosing fluorescent layers that satisfy a selected combination of requirements. When retroreflective supports, such as any of variations described above in connection with FIG. 15, are employed, image definitions can be realized equalling those of conventional intensifying screens employing black and transparent supports while significantly exceeding their maximum attainable speeds.

The first and most fundamental of preferred fluorescent layer features is that the layer have the capability of absorbing sufficient X-radiation, sometimes referred as "high X-radiation absorption cross-section". This requirement can be objectively measured. The preferred fluorescent layers are capable of attenuating greater than 5 percent (preferably at least 10 percent) of a reference X-radiation exposure produced by a Mo target tube operated at 28 kVp with a three phase power supply, wherein the reference X-radiation exposure passes through 0.03 mm of Mo and 4.5 cm of poly(methyl methacrylate) to reach said fluorescent layer mounted 25 cm from a Mo anode of the target tube and attenuation is measured 50 cm beyond the fluorescent layer. It is in general preferred that the fluorescent layer X-radiation absorption capability be as high as possible, taking other competing considerations, such as image sharpness and optical density into account. Higher X-radiation absorption efficiencies for a given phosphor coating coverage can be realized by choosing phosphors containing higher atomic number elements, such as elements in Period 6 of the Periodic Table of Elements. Since Periodic Table designations vary, particularly in element Group designations, this description conforms to the Periodic Table of Elements adopted by the American Chemical Society.

Once X-radiation has been absorbed, the next consideration is its conversion efficiency—that is, the amount of longer wavelength electromagnetic radiation emitted in relation to the amount of X-radiation absorbed. Calcuim tungstate intensifying screens are generally accepted as the industry standard for conversion efficiency measurements. Preferred phosphors are those having a conversion efficiency at least equal to that of calcium tungstate. Specifically preferred phosphors are those exhibiting conversion efficiencies at least 1.5 times greater than the conversion efficiency of calcium tungstate, such as rare earth activated lanthanum oxybromides, yttrium tantalates, and gadolinium oxysulfides.

While the relationship of imaging speed and sharpness can be improved by the reflective microlenslet support alone, it can be further improved by forming the fluorescent layer to exhibit a high modulation transfer factor (MTF) profile. The MTF profile of the fluorescent layer is preferably in all instances equal to or greater than the modulation transfer factors of Curve B in FIG. 16. Preferred fluorescent layers are those having MTF's at least 1.1 times those of reference curve B over the range of from 5 to 10 cycles per mm. Modulation transfer factor (MTF) measurement for screen-film radiographic systems is described by Kunio Doi et al, "MTF and Wiener Spectra of Radiographic Screen-Film Systems", U.S. Department of Health and Human Services, pamphlet FDA 82-8187. The profile of the individual modulation transfer factors over a range of cycles per mm is also referred to as a modulation transfer function.

Figure 16:
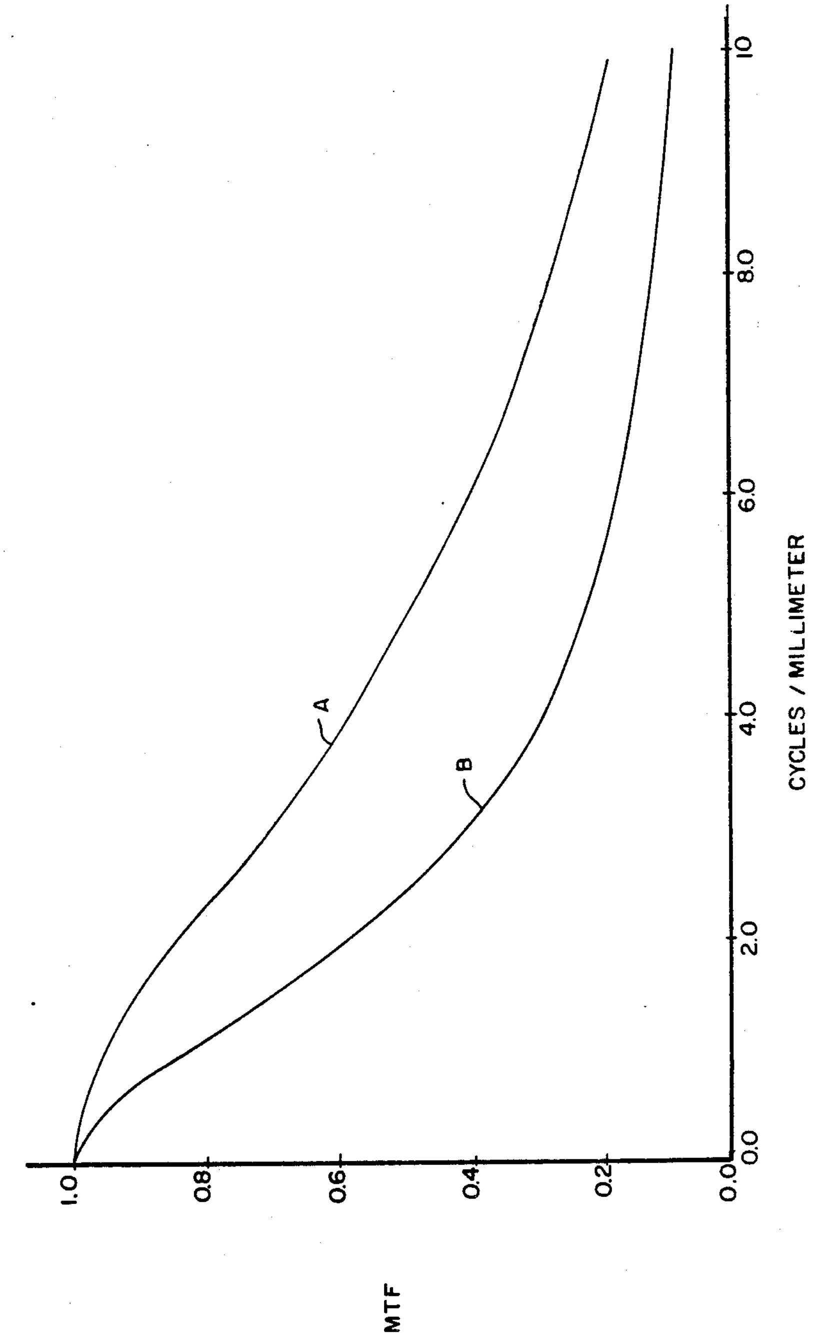
FIG. 16 is a plot of modulation transfer factors (MTF) versus cycles per millimeter, showing preferred standards of performance high definition imaging applications.

A more stringent MTF profile is represented by Curve A of FIG. 16. Intensifying screens satisfying this more stringent MTF profile were disclosed for the first time by Luckey, Roth, et al U.S. Pat. No. 4,710,637 to be employed as front screens in an assembly of the type shown in FIG. 2. This patent, however, clearly recommends the selection of transparent or black supports for front intensifying screens satisfying the MTF profile of Curve A. The reflective lenslet supports, particularly the retroreflective supports, make possible intensifying screens satisfying MTF profile Curve A exhibiting higher imaging speeds. The invention particularly improves on the front screens of Luckey, Roth, et al in permitting higher speeds to be realized while the fluorescent layer attenuates only 20 to 60 percent of the reference X-radiation exposure discussed above in connection X-radiation absorption.

By increasing the speeds of these screens they can be used as a sole intensifying screen rather than just as a front screen in an intensifying screen pair, as taught by Lucky, Roth, et al. When an intensifying screen is to be employed alone or as the back screen in an intensifying screen pair, the higher the level of X-radiation absorption achieved while satisfying sharpness, the better is the overall performance of the elements of this invention. Thus, the fluorescent layer maximum thickness teachings of Luckey, Roth, et al are not directly applicable to this invention.

It is known in the art that the sharpness of a thicker fluorescent layer can be tailored to match that of a thinner fluorescent layer by adding a substance, such as a dye or pigment, capable of absorbing a portion of the longer wavelength electromagnetic radiation emitted by the phosphor layer. Emitted radiation traveling in the fluorescent layer, to the extent it departs from a direction normal to the fluorescent layer major faces, experiences an increased path length in the fluorescent layer that increases its probability of absorption. This renders the emitted radiation which would contribute disproportionately to sharpness degradation more likely to be absorbed in the fluorescent layer, provided a light absorbing material is present. Even very small amounts of absorbing material are highly effective in improving sharpness. If desired, sharpness qualities can be tailored to specific uses by employing a light absorbing materials (e.g., carbon). Although seemingly contradictory, fluorescent layers are sometimes fabricated with combinations of longer wavelength electromagnetic radiation absorbing and scattering materials, such as combinations of carbon and titania, to adjust screen performance to a selected aim. Conventional practices of incorporating longer wavelength electromagnetic radiation absorbing and scattering materials, such as dyes, reflective pigments, carbon, etc., are fully compatible with the reflective lenslet supports. The preferred fluorescent layers of this invention rely entirely or at least primarily on the reflective lenslet support rather than incorporated white pigments in the fluorescent layer for reflection of emitted radiation.

The incorporation of a material capable of absorbing emitted radiation in the fluorescent layer reduces its effective thickness as compared to its actual thickness. The effective thickness of a fluorescent layer is herein defined as the thickness of an otherwise corresponding reference fluorescent layer having the same modulation transfer factors and consisting essentially of the phosphor and its binder in the same proportions on a support having a total reflectance of less than 20 percent.

While the incorporation of limited amounts of absorbing materials into the fluorescent layers of the intensifying screens of this invention are contemplated as a technique for decreasing effective thickness, it is preferred that their presence be limited. The reason is that light absorption within the fluorescent layer inherently reduces the speed of the intensifying screen and also increases its optical density.

The preferred fluorescent layers of the intensifying screens of this invention exhibit an optical density to emitted radiation of less than 1.0. The fluorescent layer optimally exhibits an optical density of less than 0.5. The importance of minimizing the optical density of the fluorescent layer to emitted radiation is that the emitted radiation reflected by the support must penetrate the full thickness of the fluorescent layer to reach the radiographic element and thereby contribute to enhancing imaging speed. Both the objective of contributing to image sharpness and that of maintaining a preferred low optical density can be achieved when les than 0.1 percent, most preferably less than 0.006 percent, based on the weight of the phosphor, of a material capable of absorbing emitted radiation is present in the fluorescent layer.

When the preferred X-radiation absorption, conversion efficiency, MTF, and optical density of the fluorescent layer are considered together, there are a variety of phosphors to choose among.

Phosphors of one preferred class are niobium and/or rare earth activated yttrium, lutetium, and gadolinium tantalates. For example, niobium-activated or thulium-activated yttrium tantalate has a conversion efficiency greater than 1.5 times that of calcium tungstate.

Phosphors of another preferred class are rare earth activated rare earth oxychalcogenides and oxyhalides. As herein employed rare earths are elements having an atomic number of 39 or 57 through 71. The rare earth oxychalcogenide and oxyhalide phosphors are preferaly chosen from among those of the formula:

$$M_{(w-n)}M'_nO_wX$$

wherein:

M is at least one of the metals yttrium, lanthanum, gadolinium, or lutetium,

M' is at least one of the rare earth metals, preferably cerium, dysprosium, erbium, europium, holmium, neodymium, praseodymium, samarium, terbium, thulium, or ytterbium, X is a middle chalcogen (S, Se, or Te) or halogen, n is 0.0002 to 0.2, and w is 1 when X is halogen or 2 when X is chalcogen.

For example, rare earth-activated lanthanium oxybromide has a conversion efficiency approximately 2 times that of calcium tungstate while gadolinium oxysulfide has a conversion efficiency approximately 3 times that of calcium tungstate.

Phosphors of an additional class are the rare earth activated rare earth oxide phosphors. For example, terbium-activated or thulium-activated gadolinium oxide has a conversion efficiency greater than 2 times that of calcium tungstate.

Cost considerations at times favor the use of a phosphor which limits the rare earth element to the comparatively low amounts required for activation. One specifically contemplated class of rare earth activated phosphors which do not employ a rare earth host are rare earth activated mixed alkaline earth metal sulfate phosphors. For example, europium-activated barium strontium sulfate in which barium is present in the range of from about 10 to 90 mole percent, based on the total cation content of the phosphor, and europium is present in a range of from about 0.16 to about 1.4 mole percent, on the same basis, exhibits a conversion efficiency at least equal that of calcium tungstate.

Finally, calcium tungstate is an example of a phoshor which satisfies the conversion efficiency requirement and contains no rare earth. Lead-activated barium sulfate, strontium sulfate, and barium strontium sulfate as well as lead sulfate phosphors are also known.

Calcium tungstate phosphors are illustrated by Wynd et al U.S. Pat. No. 2,303,942. Lead-activated barium sulfate phosphors are disclosed by Staudenmeyer U.S. Pat. No. 3,617,285. Rare earth activated mixed alkaline earth phosphors are illustrated by Luckey U.S. Pat. Nos. 3,650,976 and 3,778,615 and Schuil U.S. Pat. No. 3,764,554. Rare earth-activated rare earth oxide phosphors are illustrated by Luckey U.S. Pat. No. 4,032,471. Niobium-activated and rare earth-activated yttrium, lutetium, and gadolinium tantalates are illustrated by Brixner U.S. Pat. No. 4,225,653. Rare earth-activated gadolinium and yttrium middle chalcogen phosphors are illustrated by Royce U.S. Pat. No. 3,418,246. Rare earth-activated lanthanum and lutetium middle chalcogen phosphors are illustrated by Yocom U.S. Pat. No. 3,418,247. Terbium-activated lanthanum, gadolinium, and lutetium oxysulfide phosphors are illustrated by Buchanan et al U.S. Pat. No. 3,725,704. Cerium-activated lanthanum oxychloride phosphors are disclosed by Swindells U.S. Pat. No. 2,729,604. Terbium-activated and optionally cerium-activated lanthanum and gadolinium oxyhalide phosphors are disclosed by Rabatin U.S. Pat. No. 3,617,743 and Ferri et al U.S. Pat. No. 3,974,389. Rare earth-activated rare earth oxyhalide phosphors are illustrated by Rabatin U.S. Pat. Nos. 3,591,516 and 3,607,770. Terbium-activated and ytterbium-activated rare earth oxyhalide phosphors are disclosed by Rabatin U.S. Pat. No. 3,666,676. Thulium-activated lanthanum oxychloride or oxybromide phosphors are illustrated by Rabatin U.S. Pat. No. 3,795,814. A $(Y, Gd)_2O_2S$:Tb phosphor wherein the ratio of yttrium to gadolinium is between 93:7 and 97:3 is illustrated by Yale U.S. Pat. No. 4,405,691. Non-rare earth coactivators can be employed, as illustrated by bismuth and ytterbium-activated lanthanum oxychloride phosphors disclosed in Luckey et al U.S. Pat. No. 4,311,487. The mixing of phosphors as well as the coating of phosphors in separate layers of the same screen are specifically recognized. A phosphor mixture of calcium tungstate and yttrium tantalate is illustrated by Patten U.S. Pat. No. 4,387,141.

Phosphors can be used in the fluorescent layer in any conventional particle size range and distribution. It is generally appreciated that sharper images are realized with smaller mean particle sizes, but light emission efficiency declines with decreasing particle size. Thus, the optimum mean particle size for a given application is a reflection of the balance between imaging speed and image sharpness desired. Conventional phosphor particle size ranges and distributions are illustrated in the phoshor teachings cited above.

The fluorescent layer contains sufficient binder to give structural coherence to the layer. The binders employed in the fluorescent layers of the unitary elements of this invention can be identical to those conventionally employed in fluorescent screens. Such binders are generally chosen from organic polymers which are transparent to X-radiation and emitted radiation, such as sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of alkyl acrylates and methacrylates with acrylic and methacrylic acid; poly(vinyl butyral); and poly(urethane) elastomers. These and other useful binders are disclosed in U.S. Pat. Nos. 2,502,529; 2,887,379; 3,617,285; 3,300,310; 3,300,311; and 3,743,833; and in *Research Disclosure*, Vol. 154, February 1977, Item 15444, and Vol. 182, June 1979. Particularly preferred intensifying screen binders are poly(urethanes), such as those commercially available under the trademark Estane from Goodrich Chemical Co., the trademark Permuthane from the Permuthane Division of ICI, Ltd., and the trademark Cargill from Cargill, Inc.

CONVENTIONAL FEATURES

Any one or combination of conventional intensifying screen features, such as overcoats, subbing layers, and the like, compatible with the features described above can, of course, be employed. Both conventional radiographic element and intensifying screen constructions are disclosed in *Research Disclosure*, Vol. 184, Aug. 1979, Item 18431, the disclosure of which and the patents cited therein are here incorporated by reference. *Research Disclosure* is published by Kenneth Mason Publications, Ltd., Emsworth, Hampshire P010 7DD, England.

It is specifically contemplated to employ the intensifying screens in combination with silver halide radiographic elements. However, intensifying screens and radiographic elements are separate items of commerce and are rarely sold together. Thus, the selection of radiographic elements selected is a matter of user choice. In the type of assembly shown in FIG. 2, requiring a dual coated radiographic element, it is apparent to users that the radiographic elements that exhibit the lowest crossover produce the sharpest images. The highest attainable imaging speed and sharpness can be realized when low crossover tabular grain emulsion dual coated radiographic elements are employed in combination with the intensifying screens of this invention, such as those discloed by Abbott et al U.S. Pat. Nos. 4,425,425 and 4,425,426, the disclosures of which are here incorporated by reference. More recently tabular grain emulsion dual coated radiographic elements have been developed that exhibit less than 10 percent crossover and optimally less than 1 percent crossover employing a process bleachable filter dye in a layer interposed between each tabular grain emulsion layer and the radiographic element support. These radiographic elements, commonly referred to as "zero crossover" radiographic elements, are disclosed in Dickerson et al U.S. Ser. No. 73,256, filed July 13, 1987, of which U.S. Ser. No. 217,727, filed July 11, 1988, is a continuation-in-part, each being assigned to the assignee of this filing.

EXAMPLES OF INTENSIFYING SCREENS

The invention is further demonstrated by the following specific examples:

EXAMPLE 19

A stretch cavitation microvoided support, hereinafter referred to as Support A, was prepared similarly as that of Example 9 above.

The support was formed of an overall composition of four components: poly(ethylene terephthalate), Polyester C, celluloe acetate microbeads, and a small amount of zinc oxide, which was added to stabilize the hot melt.

The weight ratio of components was 73:18:9:0.14. The Polyester C component, a thermoplastic elastomer, was a mixed polyester comprising 99.5 mole percent 1,4-cyclohexanedicarboxylic acid (esterification not determined), 0.5 mole percent of trimellitic anhydride, 91.9 mole percent of 1,4-cyclohexanedimethanol, and 8.9 mole percent of poly(tetramethylene ether glycol). The overall composition had an inherent viscosity of 1.23, a glass transition temperature below 0° C., and a melting point of 200° C. On the support was coated a 1.8 μm thick subbing layer of poly(vinyl alcohol).

A control white pigment containing support, Support B, was a poly(ethylene terephthalate) support containg 8 percent by weight rutile titania.

Supports A and B were both sufficiently thick that further thickening would not produce a significant increase in reflectance. The reflectances of the supports as a function of wavelength are summarized in Table I.

TABLE I

| Wavelength | Reflectance (%) | |
|---|---|---|
| (nm) | Support A | Support B |
| 360 | 64.1 | 8.2 |
| 380 | 71.0 | 13.5 |
| 400 | 79.7 | 43.5 |
| 450 | 83.8 | 84.0 |
| 500 | 8.47 | 86.5 |
| 600 | 85.6 | 87.1 |
| 700 | 86.5 | 86.2 |

Note that the reflectances of the supports were matched over the 700 to 450 nm portion of the spectrum. At shorter wavelengths the reflectance of the titania loaded support fell off sharply, following the known characteristic of white pigments of being incapable of reflecting efficiently in all spectral regions.

A dispersion of europium-doped barium strontium sulfate phosphor with a mean particle size of approximately 5 μm was prepared from 100 g of the phosphor in a solution prepared from 117 g of polyurethane binder (trademark Permuthane U-6366) at 10 percent by weight in a 93:7 volume ratio of dichloromethane and methanol. The dispersion was coated at a phosphor coverage of 605 g/m$^2$ on Support A and 610 g/m$^2$ on Support B to produce the intensifying Screens A1 and B1, respectively.

For the sensitomeric (speed) evaluation, a pair of Screens A1 and a pair of Screens B1 were each placed in contact with a blue sensitive dual coated radiographic element commercially sold under the trademark Kodak X-Omat g film. The screen pair and radiographic arrangement for exposure like that shown in FIG. 2. The assemblies each containing a dual coated radiographic element between screen pairs were exposed through an aluminum step wedge, with a tungsten target tube operated with a single-phase power supply at 100 mA and 70 KVp, with no additional beam filtration and at a focal-film distance of 152.4 dm.

For evaluation of sharpness the radiographic element/screen pair assemblies were exposed under the same conditions as above, except that in place of the step wedge, the X-ray beam was filtered with 0.5 mm of copper and 1 mm of aluminum, and the exposure passed through a "bone and beads" test object containing bone, plastic objects, steel wool, and miscellaneous objects having fine detail. Image sharpness was visually compared.

Taking the speed of the radiographic element exposed by the control Screens B1 as 100, the relative speed of the radiographic element exposed by invention Screens A1 was 148. The sharpness of the image produced by control Screens B1 was slightly higher than that produced by invention Screens A1.

It is generally well appreciated that speed and sharpness are parameters that can be "traded off". When an advantage is seen, taking both speed and sharpness into account, the advantage can be realized entirely as a speed advantage, entirely as a sharpness advantage, or a combination of both. In this instance the large speed advantage with a small difference in sharpness demonstrated a significant improvement in the speed and sharpness relationship of the intensifying screens of this invention that can be realized entirely as a speed advantage or as a large sharpness advantage or an advantage apparent both in terms of speed and sharpness.

EXAMPLE 20

Example 19 was repeated, except that a rare earth activated rare earth oxyhalide phosphor fluorescent layer was substituted.

A dispersion was prepared employing a blue-emitting thulium-doped lanthanum oxybromide phosphor with a mean particle size of 5 μm in the amount of 100 g and the same binder solution as employed in Example 20. The dispersion was coated at a phosphor coverage of 663 g/m$^2$ on Support A and 675 g/m$^2$ on Support B to give Screens 2A and 2B.

Taking the relative speed of control Screens 2B as 100, the Screens 2A exhibited a relative speed of 120. Again the observed image sharpness produced by the Screens 2A was only slightly less than that of Screens 2B. This again demonstrated the superiority of the screens of the invention, taking both speed and sharpness into consideration.

The invention has been described in detail with particular reference to preferred embodiments thereof, but it will be understood that variations and modifications can be effected within the spirit and scope of the invention.

What is claimed is:

1. An intensifying screen for producing a latent image in a silver halide radiographic element when imagewise exposed to X-radiation comprised of a fluorescent layer capable of absorbing X-radiation and emitting for latent image formation longer wavelength electromagnetic radiation more readily absorbed by the silver halide radiographic element than X-radiation and a support capable of reflecting the longer wavelength radiation, characterized in that at least one portion of said support is comprised of reflective lenslets.

2. An intensifying screen according to claim 1 further characterized in that said support is comprised of a continuous polymeric first phase transparent to the longer wavelength radiation and a second phase also transparent to the longer wavelength radiation dispersed in said first phase and forming said reflective lenslets.

3. An intesifying screen according to claim 2 further characterized in that said polymeric continuous phase is biaxially oriented.

4. An intensifying screen according to claim 2 further characterized in that said second phase has a lower refractive index than said first phase and said lenslets have major axes oriented parallel to said fluorescent layer which are at least 1.5 times the length of minor axes oriented perpendicular to said fluorescent layer.

5. An intensifying screen according to claim 4 further characterized in that said major axes are from 3 to 10 times the length of said minor axes.

6. An intensifying screen according to claim 2 further characterized in that said second phase exhibits a refractive index which is greater than that of said first phase.

7. An intensifying screen according to claim 6 further characterized in that said second phase forms spherical lenslets.

8. An intensifying screen according to calim 7 further characterized in that the ratio of the refractive index of said first phase to that of said second phase in the range of from 1.7 to 2.1.

9. An intensifying screen according to claim 8 further characterized in that said ratio first and second phase refractive indices is two.

10. An intensifying screen according to claim 6 further characterized in that said lenslets are present in the form of beads.

11. An intensifying screen according to claim 10 further characterized in that said beads are in the form of spheroids having major axes parallel to said fluorescent layer and a minor axis normal to said fluorescent layer.

12. An intensifying screen according to claim 1 further characterized in that at least a portion of said support is comprised of three distinct phases:

a polymeric continuous phase transparent to the longer wavelength electromagnetic radiation, immiscible microbeads forming a dispersed second phase in said polymeric phase, and stretch cavitation microvoids forming reflective lenslets concentrically positioned with respect said microbeads and having major axes oriented parallel to said fluorescent layer.

13. An intensifying screen according to claim 12 further characterized in that said microbeads are transparent to the longer wavelength electromagnetic radiation.

14. An intesifying screen according to claim 1 further characterized in that said fluorescent layer is chosen so that a significant portion of the longer wavelength radiation is within the 300 to 1500 nm region of the electromagnetic spectrum.

15. An intensifying screen according to claim 14 further characterized in that said fluorescent layer is chosen to emit principally in at least one of the blue and near ultraviolet portions of the spectrum.

16. An intensifying screen according to claim 14 further characterized in that said fluorescent layer is capable of attenuating greater than 5 percent of a reference X radiation exposure produced by a Mo target tube operated at 28 kVp with a three phase power supply, wherein the reference X radiation exposure passes through 0.03 mm of Mo and 4.5 cm of poly(methyl methacrylate) to reach said fluorescent layer mounted 25 cm from a Mo anode of the target tube and attenuation is measured 50 cm beyond the fluorescent layer, contains a phosphor which exhibits a conversion efficiency at least equal to that of calcium tungstate, exhibits modulation transfer factors greater than those of reference curve B in FIG. 16, and exhibits an optical density of less than 1.0.

17. An intensifying screen according to claim 16 further characterized in that said fluorescent layer is capable of attenuating at least 10 percent of the reference X radiation exposure.

18. An intesifying screen according to claim 16 further characterized in that said intensifying screen exhibits modulation transfer factors at least equal to those of reference curve A in FIG. 16.

19. An intensifying screen according to claim 15 further characterized in that said fluorescent layer.

is capable of attenuating from 20 to 60 percent of a reference X radiation exposure produced by a Mo target tube operated at 28 kVp with a three phase power supply, wherein the reference X radiation exposure passes through a 0.03 mm of Mo and 4.5 cm of poly(methyl methacrylate) to reach said fluorescent layer mounted 25 cm from a Mo anode of the target tube and attenuation is measured 50 cm beyond the fluorescent layer, contains a phosphor which exhibits a conversion efficiency at least equal to that of calcium tungstate, exhibits modulation transfer factors at least equal to those of reference curve A in FIG. 16, and exhibits an optical density of less than 1.0.

20. An intensifying screen according to claim 1 further characterized in that said support is comprised of a portion consisting essentially of a continuous biaxially oriented polyester phase having dispersed therein microbeads of cellulose acetate which are at least partially bordered by microvoids having their major axes oriented parallel to said fluorescent layer, said microbeads of cellulose acetate being present in an amount of 10–30% by weight based on the weight of said polyester, said microvoids occupying 2–50% by volume of said support portion.

21. An intensifying screen according to claim 20 further characterized in that said support portion has a Kubelk-Munk R value (infinite thickness) of 0.90 to 10 and the following Kubelka-Munk values when formed into a 3 mil (76.2 micron) thick film:

Opacity: 0.78 to 1.0

SX: 25 or less

KX: 0.001 to 0.2

T(i): 0.02 to 1.0.

22. An intensifying screen according to claim 21 further characterized in that said polyester is poly(ethylene terephthalate) having an intrinsic viscosity of at least 0.55.

23. An intensifying screen according to claim 21 further characterized in that said cellulose acetate has an acetyl content of 28 to 44.8% by weight and a viscosity of 0.01–90 seconds.

24. An intensifying screen according to claim 21 further characterized in that said microbeads have an average diameter of 0.1–50 microns.

25. An intensifying screen for producing, when imagewise exposed to X-radiation, a latent image in a silver halide radiographic element sensitive to electromagnetic radiation in the wavelength range of from 300 to 450 nm comprised of a fluorescent layer capable of absorbing X-radiation and emitting for latent image formation longer wavelength electromagnetic radiation in the wavelength range of from 300 to 450 nm and a support capable of reflecting the longer wavelength radiation, characterized in that said fluorescent layer is capable of attenuating at least 10 percent of a reference X radiation exposure produced by a Mo target tube operated at 28 kVp with a three phase power supply, wherein the reference X radiation exposure passes through 0.03 mm of Mo and 4.5 cm of poly(-methyl methacrylate) to reach said fluorescent layer mounted 25 cm from a Mo anode of the target tube and attenuation is measured 50 cm beyond the fluorescent layer, contains a phosphor which exhibits a conversion efficiency at least 1.5 times that of calcium tungstate, exhibits modulation transfer factors greater than those of reference curve B in FIG. 16, and exhibits an optical density of less than 1.0, and at least one portion of said support consists essentially of a continuous phase of biaxially oriented poly(ethylene terephthalate) having an intrinsic viscosity of at least 0.55 having dispersed therein microbeads of cellulose acetate having an acetyl content of about 28 to 44.8 percent by weight and viscosity of about 0.01 to 90 seconds, said microbeads being at least partially bordered by microvoids having their major axes oriented parallel to said fluorescent layer, said microbeads of cellulose acetate being present in an amount of 10–30% by weight based on the weight of said polyester, said microvoids occupying 2–50% by volume of said support portion, and said support portion having a Kubelka-Munk R value (infinite thickness) of 0.90 to 1.0 and the following Kubelka-Munk values when formed into a 3 mil (76.2 micron) thick film:

Opacity: 0.78 to 1.0

SX: 25 or less

KX: 0.001 to 0.2

T(i): 0.02 to 1.0.

* * * * *